United States Patent
Meyerson et al.

(10) Patent No.: US 11,669,716 B2
(45) Date of Patent: Jun. 6, 2023

(54) SYSTEM AND METHOD FOR IMPLEMENTING MODULAR UNIVERSAL REPARAMETERIZATION FOR DEEP MULTI-TASK LEARNING ACROSS DIVERSE DOMAINS

(71) Applicant: Cognizant Technology Solutions U.S. Corporation, College Station, TX (US)

(72) Inventors: Elliot Meyerson, San Francisco, CA (US); Risto Miikkulainen, Stanford, CA (US)

(73) Assignee: Cognizant Technology Solutions U.S. Corp., College Station, TX (US)

( * ) Notice: Subject to any disclaimer, the term of this patent is extended or adjusted under 35 U.S.C. 154(b) by 499 days.

(21) Appl. No.: 16/817,153

(22) Filed: Mar. 12, 2020

(65) Prior Publication Data

US 2020/0293888 A1     Sep. 17, 2020

Related U.S. Application Data

(60) Provisional application No. 62/817,637, filed on Mar. 13, 2019.

(51) Int. Cl.
*G06N 3/04* (2023.01)
*G06N 3/08* (2023.01)
(Continued)

(52) U.S. Cl.
CPC ............. *G06N 3/047* (2023.01); *G06N 3/045* (2023.01); *G06N 3/084* (2013.01)

(58) Field of Classification Search
CPC ..... G06N 3/0472; G06N 3/0454; G06N 3/084
See application file for complete search history.

(56) References Cited

U.S. PATENT DOCUMENTS

| | | |
|---|---|---|
| 5,140,530 A | 8/1992 | Guha |
| 5,761,381 A | 6/1998 | Arci |

(Continued)

FOREIGN PATENT DOCUMENTS

| | | |
|---|---|---|
| EP | 0762294 A2 | 3/1997 |
| EP | 2422276 A1 | 2/2012 |

(Continued)

OTHER PUBLICATIONS

Kang, Zhuoliang, et al., "Learning With Whom to Share in Multi-Task Feature Learning," Proceedings of the 28th International Conference on Machine Learning, Bellevue, WA, USA, 2011, 8 pp.

(Continued)

*Primary Examiner* — Raymond L Nimox
(74) *Attorney, Agent, or Firm* — Dawn-Marie Bey; Bey & Cotropia PLLC

(57) ABSTRACT

A process for training and sharing generic functional modules across multiple diverse (architecture, task) pairs for solving multiple diverse problems is described. The process is based on decomposing the general multi-task learning problem into several fine-grained and equally-sized sub-problems, or pseudo-tasks. Training a set of (architecture, task) pairs then corresponds to solving a set of related pseudo-tasks, whose relationships can be exploited by shared functional modules. An efficient search algorithm is introduced for optimizing the mapping between pseudo-tasks and the modules that solve them, while simultaneously training the modules themselves.

14 Claims, 6 Drawing Sheets
(5 of 6 Drawing Sheet(s) Filed in Color)

(51) Int. Cl.
    *G06N 3/047* (2023.01)
    *G06N 3/084* (2023.01)
    *G06N 3/045* (2023.01)

(56) References Cited

U.S. PATENT DOCUMENTS

| | | | |
|---|---|---|---|
| 5,845,266 | A | 12/1998 | Lupien |
| 5,920,848 | A | 7/1999 | Schutzer |
| 5,930,780 | A | 7/1999 | Hughes |
| 6,240,399 | B1 | 5/2001 | Frank |
| 6,249,783 | B1 | 6/2001 | Crone |
| 7,013,344 | B2 | 3/2006 | Megiddo |
| 7,246,075 | B1 | 7/2007 | Testa |
| 7,370,013 | B1 | 5/2008 | Aziz |
| 7,444,309 | B2 | 10/2008 | Branke |
| 8,527,433 | B2 | 9/2013 | Hodjat |
| 8,639,545 | B2 | 1/2014 | Cases |
| 8,768,811 | B2 | 7/2014 | Hodjat |
| 8,775,341 | B1 * | 7/2014 | Commons .............. G06F 40/253 706/20 |
| 8,909,570 | B1 | 12/2014 | Hodjat |
| 8,918,349 | B2 | 12/2014 | Hodjat |
| 8,977,581 | B1 | 3/2015 | Hodjat |
| 9,002,759 | B2 | 4/2015 | Hodjat |
| 9,015,093 | B1 * | 4/2015 | Commons .............. B60W 30/00 706/26 |
| 9,053,431 | B1 | 6/2015 | Commons ................ G06N 3/08 |
| 9,466,023 | B1 | 10/2016 | Shahrzad |
| 9,785,886 | B1 | 10/2017 | Andoni |
| 10,255,529 | B2 * | 4/2019 | Rabinovich .......... G06N 3/0454 |
| 10,970,441 | B1 * | 4/2021 | Zhang .................... G06N 3/063 |
| 2002/0019844 | A1 | 2/2002 | Kurowski |
| 2003/0014379 | A1 | 1/2003 | Saias |
| 2003/0158887 | A1 | 8/2003 | Megiddo |
| 2004/0143559 | A1 | 7/2004 | Ayala |
| 2004/0210545 | A1 | 10/2004 | Branke |
| 2004/0254901 | A1 | 12/2004 | Bonabeau |
| 2005/0033672 | A1 | 2/2005 | Lasry |
| 2005/0136480 | A1 | 6/2005 | Brahmachari |
| 2005/0187848 | A1 | 8/2005 | Bonissone |
| 2005/0197875 | A1 | 9/2005 | Kauffman |
| 2005/0198103 | A1 | 9/2005 | Ching |
| 2006/0218107 | A1 | 9/2006 | Young |
| 2007/0100907 | A1 | 5/2007 | Bayer |
| 2007/0143198 | A1 | 6/2007 | Brandes |
| 2007/0143759 | A1 | 6/2007 | Ozgur |
| 2007/0150435 | A1 | 6/2007 | Murakawa |
| 2007/0185990 | A1 | 8/2007 | Ono |
| 2008/0071588 | A1 | 3/2008 | Eder |
| 2008/0228644 | A1 | 9/2008 | Birkestrand |
| 2009/0125370 | A1 | 5/2009 | Blondeau |
| 2009/0307638 | A1 | 12/2009 | McConaghy |
| 2009/0327178 | A1 | 12/2009 | Jacobson |
| 2010/0030720 | A1 | 2/2010 | Stephens |
| 2010/0111991 | A1 | 5/2010 | Raitano |
| 2010/0182935 | A1 | 7/2010 | David |
| 2010/0256795 | A1 | 10/2010 | McLaughlin |
| 2010/0257228 | A1 | 10/2010 | Staggs |
| 2010/0257605 | A1 | 10/2010 | McLaughlin |
| 2010/0274736 | A1 | 10/2010 | Hodjat |
| 2010/0274742 | A1 | 10/2010 | Hodjat |
| 2010/0293119 | A1 | 11/2010 | Ferringer |
| 2011/0161264 | A1 | 6/2011 | Cantin |
| 2011/0246834 | A1 | 10/2011 | Rajashekara |
| 2012/0239517 | A1 | 9/2012 | Blondeau |
| 2012/0239592 | A1 | 9/2012 | Esbensen |
| 2012/0313798 | A1 | 12/2012 | Markram ........................ 341/50 |
| 2013/0124440 | A1 | 5/2013 | Hodjat |
| 2013/0254142 | A1 | 9/2013 | Hodjat |
| 2013/0311412 | A1 | 11/2013 | Lazar et al. ............. G06N 3/08 |
| 2014/0006316 | A1 | 1/2014 | Hodjat |
| 2014/0011982 | A1 | 1/2014 | Marasco |
| 2014/0019388 | A1 | 1/2014 | Kingsbury |
| 2015/0288573 | A1 | 10/2015 | Baughman |
| 2016/0048753 | A1 | 2/2016 | Sussillo et al. .......... G06N 3/04 |
| 2016/0063359 | A1 | 3/2016 | Szegedy |
| 2016/0232445 | A1 | 8/2016 | Srinivasan |
| 2016/0242690 | A1 | 8/2016 | Principe |
| 2016/0283563 | A1 | 9/2016 | Hodjat |
| 2016/0328253 | A1 | 11/2016 | Majumdar |
| 2016/0329047 | A1 | 11/2016 | Tur |
| 2016/0329407 | A1 | 11/2016 | Takemura |
| 2016/0364522 | A1 | 12/2016 | Frey |
| 2017/0001093 | A1 | 1/2017 | Mollice |
| 2017/0060963 | A1 | 3/2017 | Whittaker |
| 2017/0063908 | A1 | 3/2017 | Muddu |
| 2017/0109355 | A1 | 4/2017 | Li |
| 2017/0148433 | A1 * | 5/2017 | Catanzaro .............. G06N 3/084 |
| 2017/0193367 | A1 | 7/2017 | Miikkulainen |
| 2017/0213156 | A1 | 7/2017 | Hammond |
| 2017/0256254 | A1 | 9/2017 | Huang |
| 2017/0323219 | A1 | 11/2017 | Shahrzad |
| 2017/0323636 | A1 | 11/2017 | Xiao et al. .............. G10L 15/16 |
| 2018/0053092 | A1 | 2/2018 | Hajizadeh |
| 2018/0114115 | A1 | 4/2018 | Liang et al. ........... G06N 3/086 |
| 2018/0114116 | A1 | 4/2018 | Liang et al. ........... G06N 3/086 |
| 2018/0240041 | A1 | 8/2018 | Koch |
| 2018/0293498 | A1 * | 10/2018 | Campos .................. G06N 3/105 |
| 2018/0357552 | A1 * | 12/2018 | Campos ................ G06F 16/901 |
| 2019/0065954 | A1 | 2/2019 | Bittner, Jr. |
| 2019/0147298 | A1 * | 5/2019 | Rabinovich .......... G06N 3/0454 382/157 |
| 2019/0244108 | A1 | 8/2019 | Meyerson et al. ..... G06N 3/084 |

FOREIGN PATENT DOCUMENTS

| | | |
|---|---|---|
| EP | 2422278 A1 | 2/2012 |
| JP | H0810804 | 1/1996 |
| JP | H08110804 | 4/1996 |
| JP | H09114797 A | 5/1997 |
| JP | 2001325041 A | 11/2001 |
| JP | 2003044665 A | 2/2003 |
| JP | 2004240671 A | 8/2004 |
| JP | 2004302741 A | 10/2004 |
| JP | 2005190372 A | 7/2005 |
| JP | 2007207173 A | 8/2007 |
| JP | 2007522547 A | 8/2007 |
| JP | 2008129984 A | 6/2008 |
| WO | 2005073854 A2 | 8/2005 |
| WO | 2010120440 A2 | 10/2010 |
| WO | 2010127039 | 11/2010 |
| WO | 2010127042 | 11/2010 |
| WO | 2017161233 | 9/2017 |
| WO | 2018211138 | 11/2018 |
| WO | 2018213840 | 11/2018 |

OTHER PUBLICATIONS

Devin, Coline, et al., "Learning Modular Neural Network Policies For Multi-Task and Multi-Robot Transfer," arXiv: 1609.07088v1, Sep. 22, 2016, 8 pp.

Unpublished Article, Modular Universal Reparameterization: Deep Multi-Task Learning Across Diverse Domains, 10 pp.

Meyerson, Elliot, "Discovering Multi-Purpose Modules Through Deep Multitask Learning," Dissertation Presented to the Faculty of the Graduate School of The University of Texas at Austin, Dec. 2018, 275 pp.

Yin, et al., "ABCNN: Attention-Based Convolutional Neural Network for Modeling Sentence Pairs," Transactions of the Association for Computational Linguistics, vol. 4, pp. 259-272, 2016, Retrieved on Aug. 4, 2019, Retrieved from the Internet: https://www.mitpressjounrals.org/doi/pdf/10.1162/tacl_a_00097.

E. Meyerson and R. Miikulainen, "Pseudo-Task Augmentation: From Deep Multitask Learning to Intratask Sharing and Back," ICML, 2018.

J. Z. Liang, et al., "Evolutionary Architecture Search for Deep Multitask Networks," GECCO, 2018.

E. Meyerson and R. Miikkulainen, "Beyond Shared Hierarchies: Deep Multitask Learning Through Soft Layer Ordering," ICLR, 2018.

(56) References Cited

OTHER PUBLICATIONS

R. Miikkulainen, et al., "Evolving Deep Neural Networks," arXiv prepring arXiv:1703.00548, 2017.
Notice of Allowance for U.S. Appl. No. 13/540,507, dated Oct. 31, 2014, 9 pp.
O'Reilly et al., "EC-Star: A Massive-Scale, Hub and Spoke, Distributed Genetic Programming System", In: Riolo etal, Genetic Programming Theory and Practice X, Apr. 19, 2013, Genetic and Evolutionary Computation, pp. 73-85 (Year 2013).
Pantridge, et al., Evolution of Layer Based Neural Networks: Preliminary Report, GECCO '16, pp. 1015-1022, Jul. 2016. (Year: 2016).
Poli, R et al., "Genetic Programming: An Introductory Tutorial and a Survey of Techniques and Applications," Univ. Essex School of Computer Science and Electronic Engineering Technical Report No. CES-475, Oct. 2007, 112 pp.
Remde et al. "Evolution of Fitness Functions to Improve Heuristic Performance," LION Dec. 8-10, 2007 II, LNCS 5313 pp. 206-219.
Rennie, Annealed dropout training of deep networks, 2014 IEEE Spoken Language Technology Workshop (SLT) 2014 (Year: 2014) 6 pages.
Risto Miikkulaiiien, "Evolving Multitask Neural Network Structure," The University of Texas at Austin and Sentient Technologies. Inc . Aug. 26, 2013, 22 pages.
Rosenbaum, et al., "Routing Networks: Adaptive Selection of Non-Linear Funcdtions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2. 16 pages.
Ruder, "An Overview of Multi-Task Learning in Deep Neural Networks," In: Cornell University Library/Computer Science/Machine Learning, Jun. 15, 2017 [online] [retrieved on Mar. 15, 2019], Retrieved from the Internet: https://arxiv.org/abs/1706.05098, 14 pages.
Sacks et al., "Design and Analysis of Computer Experiments," Statistical Science 4:4, 1989, 409-435.
Sakauchi et al., Unifine: A Next Generation Financial Solution System of Nihon Unisys Ltd., Technology Review UNISYS,' Japan, Nihon Unisys Ltd , Feb. 28, 2006, vol. 25, No. 4pp. 14-15.
Salami et al., "A fast evaluation strategy for evolutionary algorithms," Applied Soft Computing 2/3F (Jan. 2003) 156-173.
Salge, C., et al., "Empowerment—An Introduction," published in Guided Self-Organization: Inception, Chap 4, University of Hertfordshire, Copyright 2014, pp. 67-114.
Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019. 10 pages.
Santiago Gonzalez, et al., "Improved Training Speed, Accuracy, and Data Utilization Through Loss Function Optimization," Version 2, arXiv: 1905.11528v2, dated Feb. 10, 2020. 7 pages.
Santiago Gonzalez, et al., "Improved Training Speed, Accuracy, and Data Utilization Through Loss Function Optimization," Version 3, arXiv: 1905.11528v3, dated Apr. 27, 2020. 7 pages.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT20Q4), Beijing, China, Sep. 20-24, 2004, pp. 421-424.
Scott, E. O., et al., "Understanding Simple Asynchronous Evolutionary Algorithms," Jan. 17-20, 2015, 15 pp.
Secretan, J., et al., "Piebreeder: A Case Study in Collaborative Evolutionary Exploration of Design Space," Evolutionary Computation journal, MIT Press, Copyright 2011, 30 pages.
Shahrzad, et al., "Tackling the Boolean Multiplexer Function Using a Highly Distributed Genetic Programming System," in Genetic Programming Theory and Practice XII, 7 pp., 2015.
Shazeer et al., "Outrageously large neural networks: The sparsely-gated mixiure-of-experts layer," arXiv preprint arXiv:1701.08538 (2017), 19 pages.
Snoek, et al., "Scalable Bayesian Optimization Using Deep Neural Networks", 2015, 13 pages.
Stanley et al. "Evolving neural networks through augmenting topologies." Evolutionary computation 10.2, 29 pages (2002) (Year: 2002).
Stanley et al., Why greatness cannot be planned: the myth of the objective, Genet. Program Evolvable Mach.,m 16:559-561, 2015.
Stanley, Kenneth O., et al., "Real-Time Evolution of Neural Networks in the Nero Video Game," AAAI, vol. 6, 2006, 4 pp.
Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mitarb/streiche/publications/Introduction_to_E_volutionary_Algorithms.pdf)., XP055038571.
Supplementary European Search Report dated Oct. 12, 2012 in EP 10770288, 12 pages.
Supplementary European Search Report dated Oct. 9, 2012 in EP 107702871, 11 pages.
Tanev, I., et al., "Scalable Architecture for Parallel Distributed Implementation of Genetic Programming on Network of Workstations," J. Systems Architecture, vol. 47, Jul. 2001, pp. 557-572.
Torresen, "A Dynamic Fitness Function Applied to Improve the Generalisation when Evolving a Signal Processing Hardware Architecture," Proc. EvoWorkshops 2002, 267-299 (12 pp).
U.S. Appl. No. 13/184,307—Notice of Allowance dated Aug. 4, 2014, 9 pages.
U.S. Appl. No. 13/184,307—Office Action dated Oct. 21, 2013, 16 pages.
U.S. Appl. No. 14/595,991—Final Office Action dated Feb. 27, 2018, 25 pages.
U.S. Appl. No. 14/595,991—Response to Final Office Action dated Feb. 27, 2018, filed May 22, 2018, 32 pages.
U.S. Appl. No. 14/595,991—Response to Final Office Action dated Feb. 27, 2018, filed Jul. 27, 2018, 41 pages.
U.S. Appl. No. 13/184,307—Response dated Jan. 22, 2014, 19 pages.
U.S. Appl. No. 13/358,381—Response dated Oct. 3, 2014, 21 pages.
U.S. Appl. No. 13/358,381—Amendment After Allowance filed Feb. 13, 2015, 20 pages.
U.S. Appl. No. 13/895,238—Office Action dated Jan. 2, 2014, 17 pages.
U.S. Appl. No. 13/943,630—Notice of Allowance dated Jan. 21, 2016, 28 pages.
U.S. Appl. No. 13/945,630—Final Office Action dated Aug. 4, 2015, 22 pages.
U.S. Appl. No. 13/945,630—Resonse to Office Action dated Mar. 12, 2015 filed Jul. 13, 2015, 9 pages.
U.S. Appl. No. 14/014,063—Office Action dated May 7, 2014, 19 pages.
U.S. Appl. No. 14/539,908—Office Action dated Oct. 1, 2015, 33 pages.
U.S. Appl. No. 14/595,991—Response to Office Action dated May 10, 2017, filed Nov. 10, 2017, 29 pages.
U.S. Appl. No. 15/794,905, titled Evolution of Deep Neural Network Structures, 46 pages, filed Oct. 26, 2017.
U.S. Appl. No. 15/794,913 titled "Cooperative Evolution of Deep Neural Network Structures," filed Oct. 26, 2017.
U.S. Appl. No. 15/915,028, titled "Asynchronous Evaluation Strategy For Evolution of Deep Neural Networks," filed Mar. 3, 2018.
U.S. Appl. No. 62/468,224, titled "Asynchronous Evaluation Strategy For Evolution of Deep Neural Networks," filed Mar. 7, 2017.
Canadian Examination Report issued in App. No. CA3129731, dated Oct. 24, 2022, 4 pages.
U.S. Appl. No. 62/598,409, titled "Evolving Multitask Neural Network Structure," filed Dec. 13, 2017.
U.S. Appl. No. 62/627,161, titled "From Nodes to Networks: Evolving Recurrent Neural Networks," filed Feb. 6, 2018.
U.S. Appl. No. 62/627,658, titled "From Nodes to Networks: Evolving Recurrent Neural Networks," filed Feb. 7, 2018.

(56) References Cited

OTHER PUBLICATIONS

U.S. Appl. No. 13/184,307—Office Action dated Mar. 21, 2014, 38 pages.
U.S. Appl. No. 13/184,307—Response dated Jun. 23, 2014, 32 pages.
U.S. Appl. No. 13/540,507—Office Action dated Sep. 9, 2014, 25 pages.
U.S. Appl. No. 13/540,507—Response filed Oct. 15, 2014, 20 pages.
U.S. Appl. No. 13/943,630—Office Action dated May 27, 2015, 42 pages.
U.S. Appl. No. 13/943,630—Response to Office Action dated May 27, 2015 filed Sep. 23, 2015, 8 pages.
U.S. Appl. No. 13/945,630—Notice of Allowance dated Nov. 18, 2015, 8 pages.
U.S. Appl. No. 13/945,630—Office Action dated Mar. 12, 2015, 18 pages.
U.S. Appl. No. 13/945,630—Response to Final Office Action dated Aug. 4, 2015 filed Nov. 4, 2015, 12 pages.
U.S. Appl. No. 14/539,908—Response to Office Action dated Oct. 1, 2015 filed Feb. 1, 2016, 18 pages.
U.S. Appl. No. 14/595,991—Office Action dated May 10, 2017, 32 pages.
Utech, J., et al., "An evolutionary algorithm fordrawing directed graphs," Proc. of the Int. Conf. on Imaging Science, Systems and Technology, 8 pages, 1998.
Valsalam, V.K., et al., "Using Symmetry and Evolutionary Search to Minimize Sorting Networks," Journal of Machine Learning Research 14, The University of Texas at Austin, Department of Computer Science, Copyright Sep. 2013, pp. 303-331.
Wissner-Gross, et al., "Causal Entropic Forces," Physical Review Letters, PRL 110, 168702, American Physical Society, Apr. 19, 2013, 5 pages.
Written Opinion from Singapore Patent Office in related application SG 201003127-6, dated Jun. 16, 2011, 9 pp.
Wu, A.S. et al., "An incremental fitness function for partitioning parallel taks," Proc. Genetic and Evolutionary Computation Conf. (Aug. 2001) 8pp.
Xu, et al., "Inference of Genetic Regulatory Networks With Recurrent Neural Network Models Using Particle Swarm Optimization," Missouri University of Science and Technology, Oct. 2017, 36 pages, [retrieved on Feb. 14, 2019], Retrieved from the Internet: http://scholarsmine.mst.edu/cgi/viewcontent.cgi?article=1751&context=ele_comeng_facwork.
Yang et al., "Deep multi-task representation learning: A tensor factorisation approach," arXiv preprint arXiv 1605.06391 (2016), 12 pages.
Yin et al., "ABCNN: Attention-Based Convolutional Neural Network for Modeling Sentence Pairs", Transactions of the Association for Computational Linguistics, (20151216), vol. 4, pp. 259-272, XP081355040.
Zhang, Loy, "Facial Landmark Detection by Deep Multi-Task Learning," In Proceedings of ECCV'14, 2014, 15 pages.
"CS 224D: Deep Learning for NLP, Lecture Notes: Part IV", 12 pp., Spring, 2015, 12 pages.
"CS 224D: Deep Learning for NLP, Lecture Notes: Part V", 6 pp., Spring, 2015, 6 pages.
"CS 224D: Deep Learning for NLP, Lecture Notes: Part III". 14 pp., Spring, 2016.
Jun. 22, 2011 Office Action in U.S. Appl. No. 12/267,287, 16 pp.
Aug. 1, 2012 Office Action in U.S. Appl. No. 13/443,546, 12 pp.
Aditya Rawal and Risto Miikkulainen, "From Nodes to Networks: Evolving Recurrent Neural Networks," GECCO '18, Jul. 15-19, 2018, Kyoto, Japan.
Ahn, Chang Wook et al.; "Elitism-Based Compact Genetic Algorithms," IEEE, Transactions on Evolutionary Computation, vol. 7, No. 4; pp. 367-385, 2003.
Akbarzadeh et al., "Friendship Modeling for Cooperative Co-Evolutionary Fuzzy Systems: A Hybrid GA-GP Algorithm," Proc. 22nd Int'l Conf. ofN. American FIPS, Jul. 2003, pp. 61-66.
Al-Haj Baddar, "Finding Better Sorting Networks," Dissertation to Kent State University for PhD, May 2009, 86 pages.
Alex Castrounis, Innoarchtech, "Production vs. Development AI and Machine Learning," published by O'Reilly Media, Copyright InnoArchiTech LLC 2020, 24 pages.
Alex Castrounis, Innoarchtech, "Advanced Analytics Packages, Frameworks, and Platforms," 29 pages, published by O'Reilly Media, Copyright InnoArchiTech LLC 2020.
Alex Castrounis, Innoarchtech, "Python vs. R for AI, Machine Learning, and Data Science," published by O'Reilly Media, Copyright InnoArchiTech LLC 2020, 27 pages.
AU 2010241594—Examination Report dated Oct. 8, 2013, 3 pages.
AU 2010241597—Examination Report dated Nov. 4, 2013, 4 pages.
Bartlett II, J.E. et al., "Organizational Research: Determining Appropriate Sample Size in Survey Research," IT, Learning, and Performance Journal, 19(1), Spring 2001, 8 pp.
Bilen et al. "Integrated Perception with Recurrent Multi-Task Neural Networks", NIPS, 2016, pp. 9.
Bilen,et al,"Integrated perception with Reccurrent Multi-Task Neural Networks," NIPS 2016 ,9 pp.
Bongard et al., "Guarding Against Premature Convergence while Accelerating Evolutionary Search," Proc. 12th annual conf. of Genetic and evolutionary computation, Jul. 2010, 8 pages.
Bredeche et al., "On-Line , On-Board Evolution of Robot Controllers", Artifical Evolution: 9th International Conference, Evolution Artificielle , EA, Strasbourg, France, vol. 5975, (20090000), pp. 110-121, URL: https://dl.acm.org/citation.cfm?id=1883723. 1883738, (Mar. 15, 2019), XP019146179.
Bredeche, Nicolas, et al., "On-line, on-board evolution of robot controllers," International Conference on Artificial Evolution, Springer, Berlin, Heidelberg, 2009.
Bui, L.T. et al., "Local models: An approach to distributed multi-objective optimization," Computational Optimization and Applications, vol. 42, No. 1, Oct. 2007, pp. 105-139.
Caruana, R. Multitask learning. In Learning to learn, pp. 95-133. Springer US, 1998, (Year: 1998).
Castillo, Tapia M.G. et al., "Applications of multi-objective evolutionary algorithms in economics and finance: A survey," Proc. IEEE Congress on Evolutionary Computation, Sep. 2007, pp. 532-539.
Davarynejad, et al., "A Novel General Framework for Evolutionary Optimization: Adaptive Fuzzy Fitness Granulation," CEC Sep. 2007, 6 pp.
Davarynejad, "Fuzzy Fitness Granulation in Evolutionary Algorithms for complex optimization," Master of Science Thesis, Ferdowsi Univ. of Mashhad, Jun. 2007, 30 pages.
Deb, et al., "A fast and elitist multiobjective genetic algorithm: NSGA-II," IEEE Transactions on Evolutionary Computation, 6(2), 2002, pp. 182-197.
Dong, "Multi-Task Learning for Multiple Language Translation," In Proc, of ACL, pp. 1723-1732, 2015.
Ducheyne, E. et al., "Is Fitness Inheritance Useful for Real-World Applications?" Evolutionary Multi-Criterion Optimization, ser. LNCS 2631, 2003, pp. 31-42.
Enee, Gilles, et al., "Classifier Systems Evolving Multi-Agent System With Distributed Elitism," Proceedings of the 1999 Congress on Evolutionary Computation (CEC'99),vol. 3:6, Jul. 1999, pp. 1740-1746.
Exam Report for related application AU 2008323758, dated Apr. 20, 2012, 2 pp.
Extended EP SR for EP 08847214 dated Nov. 26, 2012, 9 pp.
Fernando et al., "Pathnet: Evolution channels gradient descent in super neural networks," arXiv preprint arXiv:1701.08734 (2017), 16 pages.
Fidelis, Marcos Vinicius, Heitor S. Lopes, and Alex A. Freitas, "Discovering Comprehensible Classification Rules With a Genetic Algorithm," 6 pages, Proceedings of the 2000 Congress on Evolutionary Computation, vol. 1, IEEE, 2000.
Fitzpatrick, J.M. etal., "GeneticAlgorithms in Noisy Environments," Machine Learning 3: 101-120, May 1988.
Freitas, A., "A review of evolutionary algorithms for data mining." Soft Computing for Knowledge Discovery and Data Mining, Springer US, 2008, pp. 79-111.

(56) References Cited

OTHER PUBLICATIONS

Garcia-Pedrajas, et al., "Cooperative Coevolution of Artificial Neural Network Ensembles For Pattern Classification," IEEE Transactions on Evolutionary Computation, vol. 9, No. 3, 32 pages,Jun. 3, 2005.
Garcia-Pedrajas, et al., "Cooperative-Coevolution-of-Artificial-Neural-Networks", 2005, 32 pages.
Gaspar-Cunha, A., et al., "A Multi-Objective Evolutionary" Algorithm Using Neural Networks to Approximate Fitness Evaluations, Int'l. J. Computers, Systems and Signals, 6(1), pp. 18-36, 2005.
Georgilakis, P.S. "Genetic Algorithm Model for Profit Maximization of Generating Companies in Deregulated Electricity Markets", Applied Artificial Intelligence, Jul. 2009, 23:6,538-552.
Gomes et al., "Evolution of Swarm Robotics Systems with Novelty Search," published in Swarm Intelligence, vol. 7, Issue 2, ANTS Special Issue, Copyright Sep. 2013, pp. 115-144.
Gomes et al., "Progressive Minimal Criteria Novelty Search," Lisboa, Portugal, cited in Advances in Artificial Intelligence, Springer-Verlag Berlin Heidelberg, Copyright 2012, pp. 281-290.
Gonzalez, et al., "Evolving Loss Functions With Multivariate Taylor Polynomial Parameterization," Version 2, published arXiv: 2002.00059v2), Feb. 10, 2020, 8 pages.
Gonzalez, et al., "Evolving Loss Functions With Multivariate Taylor Polynomial Parameterizations," Version 1, published arXiv: 2002.00059v1, Jan. 31, 2020. 12 pages.
Gonzalez, et al., "Optimizing Loss Functions Through Multivariate Taylor Polynomial Parameterization," Version 3 (published arXiv 2002.00059v3), Jun. 6, 2020, 13 pages.
Gupta et al., "An Overview of methods maintaining Diversity in Generic Algorithms," International Journal of Emerging Technology and Advanced Engineering, vol. 2, Issue 5, May 2012, pp. 56-60.
H. Li, et al., "Visualizing the loss landscape of neural nets," Advances in Neural Information Processing Systems 31, pp. 6389-6399 (Curran Associates, Inc., 2018), arXiv:1712.09913v3, Nov. 7, 2018.
Hansen, et al., "Completely derandomized self-adaptation in evolution strategies," Evolutionary Computation, vol. 9, No. 2, pp. 159-195, 2001.
Hodjat et al., "Maintenance of a Long Running Distributed Genetic Programming System for Solving Problems Requiring Big Data",In: Riolo et al., Genetic Programming Theory and Practice XI, Mar. 10, 2014, Genetic and Evolutionary Computation, pp. 65-83 (Year: 2014).
Hodjat et al., "nPool: Massively Distributed Simultaneous Evolution and Cross-Validation in EC-Star", ppt at GPTP May 2015, 16 pages.
Hodjat, B., et al., "Introducing an Age-Varying Fitness Estimation Function," Genetic Finance, Chapter 5, Genetic Programming Theory and Practice, Springer Science+Business Media New York, Copyright 2013, pp. 59-71.
Hornby, "The Age-Layered Population Structure (ALPS) Evolutionary Algorithm," GECCO '19, Jul. 8-12, 2009.
Hornby, "ALPS: The Age-Layered Population Structure for Reducing the Problem of Premature Convergence," GECCO '06, Seattle, WA, Jul. 2006, 8 pp.
Hornby, G. S. "A Steady-State Version of the Age-Layered Population Structure EA," Chapter 1 of Genetic Programming Theory and Practice VII, Riolo, et al., editors, Springer 2009, 16 pp.
Hornby, G. S., "Steady-State ALPS for Real-Valued Problems," GECCO '09, Montreal, Jul. 2009, Assoc. of Computing Machinery, 8 pp.
Idesign lab, "ALPS—the Age-Layered Population Structure," UC Santa Cruz web article printed Mar. 17, 2011, 3 pp. (http://idesign.ucsc.edu/projects/alps.html).
International Preliminary Report on Patentability for PCT App. PCT/US2019/061198,dated Nov. 18, 2020, 24 pp.
International Search Report and Written Opinion for Application No. PCT/US2018/064520, dated Mar. 4. 2019. 8 pages.
International Search Report and Written Opinion for PCT App. No. PCT/US19/61198,dated Mar. 11, 2020, 15 pp.
International Search Report and Written Opinion for PCT Application No. PCT/US18/64428, dated Mar. 26, 2019, 12 pp.
International Search Report and Written Opinion for PCT Application No. PCT/US18/65472, dated Mar. 27, 2019, 8 pp.
International Search Report and Written Opinion for PCT Application No. PCT/US18/66610, dated Apr. 15, 2019, 8 pp.
International Search Report and Written Opinion for PCT Application No. PCT/US2008/82876, dated Dec. 23, 2008, 8 pp.
International Search Report and Written Opinion for PCT Application No. PCT/US2019/017175, dated Jun. 5, 2019, 10 pp.
International Search Report dated Jul. 2, 2010 in PCT/US 10/32847, 3 pages.
International Search Report dated Jun. 29, 2010 in PCT/US 10/32841, 3 pages.
J. T. Barron, "A General and Adaptive Robust Loss Function," arXiv: 1701.03077, 2018, 19 pages.
James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=1wAR3hreOvBGmJZe54-631X49XedcbsQoDYIRu87BcCHEBf_vMKF8FDKK_7Nw.
JP 2010-533295, Office Action dated Apr. 16, 2013, 3 pages.
JP 2012-508660-Office Action dated Apr. 1, 2014, 8 pages.
JP 2012-508663-Office Action dated Apr. 1, 2014, 6 pages.
Juille, H., "Evolution of Non-Deterministic Incremental Algorithms as a New Approach for Search in State Spaces," Proc 6th Int'l. Conf. on Genetic Algorithms, 1995 8 pp.
Jul. 27, 2012 Final Office Action in U.S. Appl. No. 12/267,287, 14 pp.
Julian G. Zilly, Rupesh Kumar Srivastava, Jan Koutnik, and Jurgen Schmidhube, "Recurrent Highway Networks." CoRR abs/1607.03474. 2016 (Arxiv: 1607.03474} 13 pages.
K. Janocha and W. M. Czarnecki, "On Loss Functions for Deep Neural Networks in Classification," arXiv: 1702.05659, 10 pages, 2017.
Kenneth O. Stanley and Risto Miikkulainen, "Evolving Neural Networks Through Augmenting Topologies," Evolutionary Computation, 10(2):99-127, 2002.
Kipfer et al., "UberFlow: A GPU-Based Particle Engine," Computer Graphics and Visualization, The Eurographics Association, Copyright 2004, 9 pages.
Kosorukoff, A. "Using incremental evaluation and adaptive choice of operators in a genetic algorithm," Proc. Genetic and Evolutionary Computation Conference, GECCO—Sep. 2002, 7pp.
Koza, J.R., "Genetic Programming: On the Programming of Computers by Means of Natural Selection", 1992, MIT Press pp. 1-609.
Krcah, P., et al., "Combination of Novelty Search and Fitness-Based Search Applied to Robot Body-Brain Co-Evolution," Charles University, Prague Czech Republic, in Proceedings of the 13th Czech-Japan Seminar on Data Analysis and Decision Making in Service Science, 2010, 6 pages.
Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pp.
Laumanns, Marco, et al., "A Unified Model for Multi-Objective Evolutionary Algorithms with Elitism," IEEE, pp. 46-53, 2000.
Lee, Chi-Ho, et al., "Evolutionary ordered neural network with a linked-list encoding scheme," Proceedings of IEEE International Conference on Evolutionary Computation, IEEE, 5 pages, 1996.
Lehman et al., "Evolving a Diversity of Creatures through Novelty Search and Local Competition," Proceedings of the Genetic and Evolutionary Computation Conference, ACM, New York, NY, 2011, 8 pages.
Lehman et al., "Abandoning Objectives: Evolution through the Search for Novelty Alone," Evolutionary Computation journal, (19):2, MIT Press, Copyright 2011, pp. 189-223.
Lehman et al., "Efficiently Evolving Programs through the Search for Novelty," Proceedings of the Genetic and Evolutionary Computation Conference, ACM, New York NY, Copyright 2010, 8 pages.

(56) References Cited

OTHER PUBLICATIONS

Lehman et al., "Extinction Events Can Accelerate Evolution," PLOS ONE, journal.pone.0132886, Aug. 12, 2015, 16 pages.

Lehman et al., "Overcoming Deception in Evolution of Cognitive Behaviors," University of Texas at Austin, ACM, Jul. 12-16, 2014, 8 pages.

Lehman, Joel, et al., "Exploiting Open-Endedness to Solve Problems Through the Search for Novelty," ALIFE, 8 pages, 2008.

Leon, C. et al., 'Parallel hypervolume-guided hyperheuristic for adapting the multi-objective evolutionary island model', NICSO 2008, Studies in Computational Intelligence, Nov. 12, 2008, vol. 236pp. 261-272.

Li, Xiaodong, and Michael Kirley. "The effects of varying population density in a fine-grained parallel genetic algorithm." Evolutionary Computation, 2002. CEC'02. 6 pages. Proceedings of the 2002 Congress on. vol. 2. IEEE2002.

Liang, et al., "Population-Based Training for Loss Function Optimization," 10 pages, arXiv:2002.04225vI (Feb. 11, 2020).

Lopez Haimes et al., "MRMOGA: parallel evolutionary multi-objective optimization using multiple resolutions," In: Proceedings of IEEE Congress on Evolutionary Computation, 2294-2301, 2005.

Misra et al., "Cross-stitch networks for multi-task learning," In Proceedings of the IEEE Conference on Computer Visior and Pattern Recognition, pp. 3994-4003. 2016.

Moriarty, David E., et al., "Forming neural networks through efficient and adaptive coevolution," Evolutionary Computation 5.4, 28 pages, 1997.

Mouret, J. B., et al., "Encouraging Behavioral Diversity in Evolutionary Robotics: An Empirical Study," MIT, Evolutionary Computation, 20(1):91-133, 2012.

Myers, R.N. and Montgomery, D.C., "Response Surface Methodology: Process and Product Optimization Using Designed Experiments," New York: John Wiley and Sons, Inc., 1995pp. 1-700.

N. Hansen, et al, "Adapting arbitrary normal mutation distributions in evolution strategies:The covariance matrix adaptation," In Proceedings of IEEE International Conference on Evolutionary Computation, pp. 312-317, IEEE, 1996.

N. Hansen, et al., "Evaluating the CMA evolution strategy on multimodal test functions," International Conference on Parallel Problem Solving from Nature, Springer, pp. 282-291, 2004.

Nelson, A., "Fitness Functions in Evolutionary Robotics: A Survey and Analysis," Robotics and Autonomous Systems 57, 2009, 345-370.

Notice of Allowance for U.S. Appl. No. 13/358,381, dated Nov. 19, 2014, 5 pp.

\* cited by examiner

SYSTEM AND METHOD FOR IMPLEMENTING MODULAR UNIVERSAL REPARAMETERIZATION FOR DEEP MULTI-TASK LEARNING ACROSS DIVERSE DOMAINS

CROSS-REFERENCE TO RELATED APPLICATIONS

The present application claims the benefit of priority to U.S. Provisional Patent Application No. 62/817,637, entitled "SYSTEM AND METHOD FOR IMPLEMENTING MODULAR UNIVERSAL REPARAMETERIZATION FOR DEEP MULTI-TASK LEARNING ACROSS DIVERSE DOMAINS", which was filed on Mar. 13, 2019 and is incorporated herein by reference in its entirety.

Additionally, the following patent applications are incorporated herein by reference in their entireties and are intended to be part of the present disclosure: U.S. patent application Ser. No. 16/270,681 titled "SYSTEM AND METHOD FOR PSEUDO-TASK AUGMENTATION IN DEEP MULTITASK LEARNING," filed on Feb. 8, 2019; U.S. Provisional Patent Application No. 62/628,248 titled "PSEUDO-TASK AUGMENTATION: FROM DEEP MULTITASK LEARNING TO INTRATASK SHARING AND BACK," filed on Feb. 8, 2018; U.S. Provisional Patent Application No. 62/684,125 titled "PSEUDO-TASK AUGMENTATION: FROM DEEP MULTITASK LEARNING TO INTRATASK SHARING AND BACK," filed on Jun. 12, 2018; U.S. Provisional Patent Application No. 62/578,035, titled "DEEP MULTITASK LEARNING THROUGH SOFT LAYER ORDERING", filed on Oct. 27, 2017 and U.S. Nonprovisional patent application Ser. No. 16/172,660, titled "BEYOND SHARED HIERARCHIES: DEEP MULTITASK LEARNING THROUGH SOFT LAYER ORDERING", filed on Oct. 26, 2018; U.S. Nonprovisional patent application Ser. No. 15/794,905, titled "EVOLUTION OF DEEP NEURAL NETWORK STRUCTURES", filed on Oct. 26, 2017; and U.S. Nonprovisional patent application Ser. No. 15/794,913, titled "COOPERATIVE EVOLUTION OF DEEP NEURAL NETWORK STRUCTURES", filed on Oct. 26, 2017.

Additionally, one skilled in the art appreciates the scope of the existing art which is assumed to be part of the present disclosure for purposes of supporting various concepts underlying the embodiments described herein. By way of particular example only, prior publications, including academic papers, patents and published patent applications listing one or more of the inventors herein are considered to be within the skill of the art and constitute supporting documentation for the embodiments discussed herein.

FIELD OF THE TECHNOLOGY

The technology disclosed herein aims to further the discovery of machine learning techniques that can be applied across diverse sets of problems. More particularly, in the art of deep multitask learning, the goal is to discover and exploit aspects of shared structure automatically across diverse sets of problems by training a joint model across multiple complex tasks. The present embodiments introduce a deep multitask learning framework for collecting generic functional modules that are used in different ways to solve different problems. Within this framework, a progression of systems is developed based on assembling shared modules into task models and leveraging the complementary advantages of gradient descent and evolutionary optimization.

BACKGROUND

Existing deep multitask learning (DMTL) approaches focus on discovering multipurpose, monolithic feature extractors. And improving feature extraction is a core goal of deep learning, but restricting multitask learning to sharing of this kind significantly constrains the kinds of functional regularities that can be discovered. In contrast, a more directly modular approach to deep multitask learning could discover generic functionality that monolithic systems and humans cannot. This modularity would lead to more flexible, higher performing solutions that could be applied across the many deep learning application areas, and would align more closely with how functionality is organized in the real world.

The pursuit of multi-purpose modules through deep multitask learning raises three key challenges that any practical method will have to address if it is to achieve the flexibility, adaptability, and efficiency that the modular approach promises. These challenges arise from the questions of module form, module assembly, and module generality.

First, the form of constituent modules will be integral to the design of the system. The natural definition of a deep learning module as a computational subgraph is so broad that it includes modules defined by individual learned parameters all the way up to modules that encompass the entire model for a task. By specifying the set of subgraphs that constitute modules, a system implies what scale of modularity it is looking for, and what kinds of modules it can discover. For example, in the deep learning setting, it is natural to define a module by a network layer; indeed, this is one of the approaches taken in the embodiments described herein. As two more examples, existing deep multitask learning approaches define modules at the level of feature extractors, while some modular neuroevolution approaches, such as SANE (Moriarty & Miikkulainen, 1996) and ESP (Gomez & Miikkulainen, 1997), define modules at the level of individual neurons. Finding a practical balance in scale is a key challenge: if modules are too simple, they may not be expressive enough to capture interesting regularities; if they are too complex, they approach the monolithic case, where it may be difficult for them to adapt to diverse purposes.

Second, the system will require a method that determines how modules are assembled into complete models for each task. From the multitask learning perspective, this is the question of how to share learned structure across tasks. How to assemble modules is related to the problem of designing deep learning architectures. Designing deep models for a single task is already a challenging problem that is being approached with automated techniques, since the complexity of many modern architectures is beyond what humans can design manually. Designing architectures that support multiple tasks adds another level of complexity to the problem, and determining which modules to use at which location in such an architecture complexifies things further. A key challenge of any system is to pair a space of possible constructions with a practical method for discovering effective constructions within this space. For example, in a very restricted assembly space, finding optimal constructions in this space may be easy, at the cost of diminishing the upper bound of system performance.

Third, and most importantly, a successful system must force resulting modules to be generic. In the trivial case, each module is used for only a single purpose and the system collapses to a standard deep learning model. This collapse can be avoided by ensuring that modules are trained for multiple purposes, i.e., to solve sets of distinct pseudo-tasks. Again, the potential of the system is determined by the scale of generality that can emerge. For example, a set of modules in which each solves only a small set of similar pseudo-tasks will be inherently less general than a set of modules in which each solves a large diverse set. A key challenge of multitask learning is to successfully exploit regularities across seemingly disparate problems. In such a setting, there may be no intuitive way to construct fixed multitask architectures, so a more general and automated approach is required. In the case of diverse tasks, and even when tasks are apparently similar, care must always be taken to avoid negative transfer, i.e., when well-intentioned sharing of structure actually ends up reducing performance. Such degradation can occur when a module is trained to support more functionality than it is capable of expressing. The module may indeed be generic, in that it provides value for a diverse set of applications, but its value for each of those applications may be suboptimal. Accordingly, enabling discovery of highly generic modules while avoiding negative transfer is thus a key challenge existing in the prior art.

BRIEF SUMMARY OF EMBODIMENTS

A first exemplary embodiment is a machine-learning process for training and sharing generic functional modules across multiple diverse (architecture, task) pairs for solving multiple diverse problems. The process includes: decomposing by one or more specially programmed processors each of the multiple (architecture, task) pairs into equally sized pseudo-tasks; aligning by the one or more specially programmed processors pseudo-tasks across the multiple diverse architectures; and sharing by the one or more specially programmed processors learned parameters across the aligned pseudo-tasks, wherein each diverse architecture is preserved in performance of its paired task.

A second exemplary embodiment is a machine-learning process for training and sharing functional modules across diverse architectures for performing diverse tasks without changing functional forms of underlying predictive models. The process includes: decomposing by one or more specially programmed processors each parameter set for each predictive model into parameter blocks, wherein a parameter block is parameterized by a module; sharing by the one or more specially programmed processors modules across the diverse architectures in accordance with a predetermined alignment, wherein the diverse architectures perform diverse tasks and the sharing of modules improves performance in each diverse task.

A third exemplary embodiment is a computer-implemented learning process for training and sharing generic functional modules across multiple diverse (architecture, task) pairs for solving multiple diverse problems. The computer-implemented process includes: means for decomposing by one or more specially programmed processors each of the multiple (architecture, task) pairs into equally sized pseudo-tasks; means for aligning by the one or more specially programmed processors pseudo-tasks across the multiple diverse architectures; and means for sharing by the one or more specially programmed processors learned parameters across the aligned pseudo-tasks, wherein each diverse architecture is preserved in performance of its paired task.

BRIEF DESCRIPTION OF FIGURES

In addition to the figures found in the materials incorporated herein by reference, the present patent or application file contains at least one drawing executed in color. Copies of this patent or patent application publication with color drawing(s) will be provided by the Office upon request and payment of the necessary fee.

DETAILED DESCRIPTION

Figure 1:
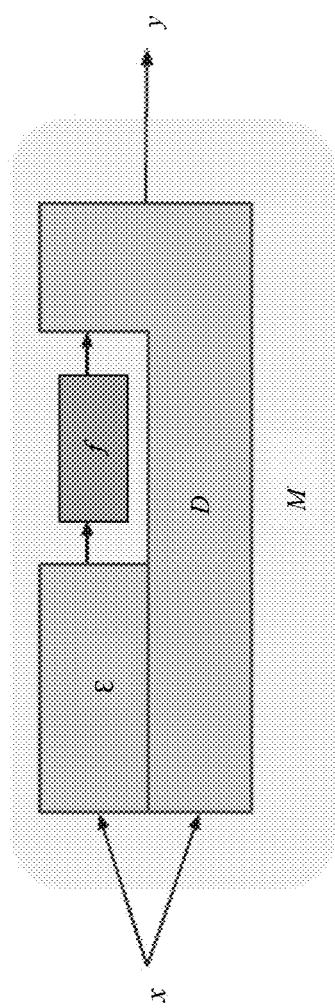
FIG. 1 depicts a pseudo-task decomposition formulation in accordance with one or more embodiments herein.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Terminology

Architecture: As used herein, the term "architecture" refers to a specification of how modules are connected and composed, which results in the space of possible functions for solving a problem. For example, convolutional architectures are often used for computer vision problems, and recurrent architectures are often used for natural language processing problems.

Model: As used herein, the term "model" refers to an architecture along with specific parameters for that architecture, which results in a single function for solving problem. For example, a convolutional architecture may be trained with gradient descent on a computer vision problem, resulting in a model that can make predictions.

Module: As used herein, the term "module" refers to a processor that receives information characterizing input data and generates an alternative representation and/or characterization of the input data. A neural network is an example of a module. Other examples of a module include a multilayer perceptron, a feed-forward neural network, a recursive neural network, a recurrent neural network, a deep neural network, a shallow neural network, a fully-connected neural network, a sparsely-connected neural network, a convolutional neural network that comprises a fully-connected neural network, a fully convolutional network without a fully-connected neural network, a deep stacking neural network, a deep belief network, a residual network, echo state network, liquid state machine, highway network, maxout network, long short-term memory (LSTM) network, recursive neural network grammar (RNNG), gated recurrent unit (GRU), pre-trained and frozen neural networks, and so on. Yet other examples of a module include individual components of a convolutional neural network, such as a one-dimensional (ID) convolution module, a two-dimensional (2D) convolution module, a three-dimensional (3D) convolution module, a feature extraction module, a dimensionality reduction module, a pooling module, a sub sampling module, a batch normalization module, a concatenation module, a classification module, a regularization module, and so on. In implementations, a module comprises learnable submodules, parameters, and hyperparameters that can be trained by back-propagating the errors using an optimization algorithm. The optimization algorithm can be based on stochastic gradient descent (or other variations of gradient descent like batch gradient descent and mini-batch gradient descent). Some examples of optimization algorithms used by the technology disclosed include Momentum, Nesterov accelerated gradient, Adagrad, Adadelta, RMSprop, and Adam. In implementations, a module is an activation module that applies a non-linearity function. Some examples of non-linearity functions used by the technology disclosed include a sigmoid function, rectified linear units (ReLUs), hyperbolic tangent function, absolute of hyperbolic tangent function, leaky ReLUs (LReLUs), and parametrized ReLUs (PReLUs). In implementations, a module is a classification module. Some examples of classifiers used by the technology disclosed include a multi-class support vector machine (SVM), a Softmax classifier, and a multinomial logistic regressor. Other examples of classifiers used by the technology disclosed include a rule-based classifier. In implementations, a module is a pre-processing module, such as an input module, a normalization module, a patch-extraction module, and a noise-addition module. In implementations, a module is a post-processing module, such as an output module, an estimation module, and a modelling module. Two modules differ in "type" if they differ in at least one submodule, parameter, or hyperparameter. In some implementations, certain modules are fixed topology modules in which a certain set of submodules are not evolved/modified and/or only evolved/modified in certain generations, and only the interconnections and interconnection weights between the submodules are evolved.

In implementations, a module comprises submodules, parameters, and hyperparameters that can be evolved using genetic algorithms (GAs). Modules need not all include a local learning capability, nor need they all include any submodules, parameters, and hyperparameters, which can be altered during operation of the GA Preferably some, and more preferably all, of the modules are neural networks, which can learn their internal weights and which are responsive to submodules, parameters, and hyperparameters that can be altered during operation of the GA Any other conventional or future-developed neural networks or components thereof or used therein, are considered to be modules. Such implementations will be readily apparent to those skilled in the art without departing from the spirit and scope of the technology disclosed.

Hypermodule: A hypermodule is a module whose output is the parameters for another module. In particular, hypermodules can be used to parameterize the modules that comprise fixed architectures.

Parameter: A parameter is a single scalar value that serves a role in yielding a specific function from a module. For example, in a feed-forward neural network, parameters scale the value of each connection in the network. A module will usually contain many trainable parameters.

Parameter Block: As used herein, a "parameter block" is a group of parameters which define a linear map inside of any module in which they occur.

Hyperparameter: A hyperparameter is a value that specifies how the algorithm itself will run, and is not trained by gradient descent or evolution.

Task: A task is defined by a set of input samples and output samples, with the goal of predicting the output from the input. A candidate solution to a task consists of a function that maps the input space to the output space.

Pseudo-Task: A pseudo-task is defined by a task along with a partial model, with the goal of completing the partial model in order to best solve the task. For example, the goal of a pseudo-task could be to find the best final layer of an already trained neural network.

Domain: A domain is the space from which the input data is drawn. For example, for a computer vision task, the domain could be the space of all 32×32 RGB images; for a natural language processing task, it could be the space of all English words.

Deep learning methods and applications continue to become more diverse. They now solve problems that deal with fundamentally different kinds of data, including those of human behavior, such as vision, language, and speech, as well as those of natural phenomena, such as biological, geological, and astronomical processes.

Across these domains, deep learning architectures are painstakingly customized to different problems. However, despite this extreme customization, a crucial amount of functionality is shared across solutions. For one, architectures are all made of the same ingredients: some creative composition and concatenation of high-dimensional linear maps and elementwise nonlinearities. They also share a common set of training techniques, including popular initialization schemes and gradient-based optimization methods. The fact that the same small toolset is successfully applied to all these problems implies that the problems have a lot in common. Sharing these tools across problems exploits some of these commonalities, i.e., by setting a strong priority on the kinds of methods that will work. Such sharing is methodological, with humans determining what is shared.

In accordance with the embodiments described herein, a system and process for learning sets of generic functional modules solves two problems that limit previously described systems: it scales many-module systems to complex modern architectures, and it shares modules across diverse architectures and problem areas. The system of the present embodiments makes no changes to the functional form of the underlying predictive model. Instead, it breaks the parameter set for a model into parameter blocks, each of which is parameterized by a module. As a result, the modules that are learned are fully generic, in that they can be applied to any kind of architecture whose parameters can be chunked into blocks of the given size. This generality enables sharing across problems of different modalities, e.g., from vision to text to genomics, and different layer types, e.g., from convolutions to LSTMs to fully-connected layers. The results indicate that sharing can be beneficial in this setting, which opens the door to future methods that accumulate vast knowledge bases over highly diverse problems and indefinite lifetimes.

As described below, the present embodiments seeks to exploit commonalities across domains that cannot be capture by human-based methodological sharing. Said another way, the following embodiments show that it can be beneficial to share learned functionality across a diverse set of domains and tasks, e.g., across (architecture, task) pairs such as 2D convolutional vision network, an LSTM model for natural language, and a 1D convolutional model for genomics. As discussed below, given an arbitrary set of (architecture, task) pairs, learned functionality can be shared across architectures to improve performance in each individual task.

Drawing on existing approaches to DMTL, e.g., sharing knowledge across tasks in the same domain or modality, one or more embodiments described herein are intended to show that such effective sharing across architectures is indeed possible. The process is based on decomposing the general multi-task learning problem into several fine-grained and equally-sized subproblems, or pseudo-tasks. Training a set of (architecture,task) pairs then corresponds to solving a set of related pseudo-tasks, whose relationships can be exploited by shared functional modules. To make this framework practical, an efficient search algorithm is introduced for optimizing the mapping between pseudo-tasks and the modules that solve them, while simultaneously training the modules themselves. As discussed below, this process, modular universal reparameterization (MUiR), is validated in a synthetic MTL (multitask learning) benchmark problem, and then applied to large-scale sharing between the disparate modalities of vision, NLP, and genomics. MUiR leads to improved performance on each task, and highly-structured architecture-dependent sharing dynamics, in which the modules that are shared more demonstrate increased properties of generality. These results show that MUiR makes it possible to share knowledge across diverse domains, thus establishing a key ingredient for building general problem solving systems in the future.

The embodiments discussed herein describe a process for facilitating sharing learned functionality across architectures to improve performance in each task, wherein the (architecture, task) pairs are arbitrary. The process satisfies two key requirements: (1) It supports any given set of architectures, and (2) it aligns parameters across the given architectures.

Parameters in two architectures are aligned if they have some learnable tensor in common. An alignment across architectures implies how tasks are related, and how much they are related. As mentioned above, various DMTL approaches have been described in the prior art which improve performance across tasks through joint training of aligned architectures, to exploit inter-task regularities. But all of the known approaches fail to meet either one or both of the key requirements (1) and (2).

For example, the classical approach to DMTL considers a joint model across tasks in which some aligned layers are shared completely across tasks, and the remaining layers remain task-specific. In practice, the most common approach is to share all layers except for the final classification layers. A more flexible approach is to not share parameters exactly across shared layers, but to factorize layer parameters into shared and task-specific factors. Such approaches work for any set of architectures that have a known set of aligned layers. However, these methods only apply when such alignment is known a priori. That is, they do not meet requirement (2), i.e., aligning of parameters across given architectures.

An approach to overcome the alignment problem is to design an entirely new architecture that integrates information from different tasks and is maximally shared across tasks. Such an approach can even be used to share knowledge across disparate modalities. However, by disregarding task-specific architectures, this approach does not meet condition (1). Related approaches attempt to learn how to assemble a set of shared modules in different ways to solve different tasks, whether by gradient descent, reinforcement learning, or evolutionary architecture search. These methods also construct new architectures, so they do not meet requirement (1); however, they have shown that including a small number of location-specific parameters is crucial to sharing functionality across diverse locations.

As described further herein, the present embodiment introduces a method that meets both conditions. First, a simple decomposition is introduced that applies to any set of architectures and supports automatic alignment. This decomposition is extended to include a small number of location-specific parameters, which are integrated in a manner mirroring factorization approaches. Then, an efficient alignment method is developed that draws on automatic assembly methods. These methods combine to make it possible to share effectively across diverse architectures and modalities.

The following describes a framework for decomposing sets of (architecture, task) pairs into equally-sized subproblems (i.e., pseudo-tasks), sharing functionality across aligned subproblems via a simple factorization, and optimizing this alignment with an efficient stochastic algorithm. First in decomposing the sets of pairs into linear pseudo-tasks, Consider a set of T tasks $\{\{x_{ti}, y_{ti}\}_{i=1}^{N_t}\}_{t=1}^{T}$ with corresponding model architectures $\{M_t\}_{t=1}^{T}$ each parameterized by a set of trainable tensors $\theta_{M_t}$. In MTL, these sets have non-trivial pairwise intersections, and are trained in a joint model to find optimal parameters $\theta_{M_t}^*$ for each task:

$$\bigcup_{t=1}^{T} \theta_{M_t}^* = \operatorname{argmin}_{\bigcup_{t=1}^{T} \theta_{M_t}} \frac{1}{T} \sum_{t=1}^{T} \frac{1}{N_t} \sum_{i=1}^{N_t} \mathcal{L}_t(y_{ti}, \hat{y}_{ti}), \quad (1)$$

where $\hat{y}_{ti} = M_t(x_{ti}; \theta_{M_t})$ is a prediction and $\mathcal{L}_t$ is a sample-wise loss function for the tth task. Given fixed task architectures, the key question in designing an MTL model is how the $\theta_{M_t}$ should be aligned. The following decomposition provides a generic way to frame this question. Suppose each tensor in each $\theta_{M_t}$ can be decomposed into equally-sized parameter blocks $B_\ell$ of size m×n, and there are L such blocks total across all $\theta_{M_t}$. Then, the parameterization for the entire joint model can be rewritten as:

$$U_{t=1}^{T} \theta_{M_t} = (B_1, \ldots, B_L). \quad (2)$$

That is, the entire joint parameter set can be regarded as a single tensor $B \in \mathbb{R}^{L \times m \times n}$. The vast majority of parameter tensors in practice can be decomposed in this way such that each $B_\ell$ defines a linear map. For one, the pm×qn weight matrix of a dense layer with pm inputs and qn outputs can be broken into pq blocks of size m×n, where the (i,j)th block defines a map between units im to (i+1)m−1 of the input space and units jn to (j+1)n−1 of the output space. This approach can be extended to convolutional layers by separately decomposing each matrix corresponding to a single location in the receptive field. Similarly, the parameters of an LSTM layer are contained in four matrices, each of which can be separately decomposed. When m and n are relatively small, the requirement that m and n divide their respective dimensions is a minor constraint; layer sizes can be adjusted without noticeable effect, or overflowing parameters from edge blocks can be discarded.

Now, if each $B_\ell$ defines a linear map, then training $B_\ell$ corresponds to solving L linear pseudo-tasks that define subproblems within the joint model. Suppose $B_\ell$ defines a linear map in $M_t$. Then, the $\ell$ th pseudo-task is solved by completing the computational graph of $M_t$ with the subgraph corresponding to $\mathbf{B}_\ell$ removed. The $\ell$ th pseudo-task is denoted by a five-tuple $$(\mathcal{E}_\ell, \theta_{\mathcal{E}_\ell}, \mathcal{D}_\ell, \theta_{\mathcal{D}_\ell}, \{x_{ti}, y_{ti}\}_{i=1}^{N_t}), \tag{3}$$

where $\theta_{\mathcal{E}_\ell}$ is the encoder that maps each $x_{ti}$ to the input of a function solving the pseudo-task, and $D_t$ takes the output of that function (and possibly $x_{ti}$) to the prediction $\hat{y}_{ti}$. The parameters $\mathcal{D}_\ell$ and $\mathcal{D}_\ell$ characterize $\theta_{\mathcal{E}_\ell}$ and $D_t$, respectively.

In general, given a pseudo-task, the model for the tth task is completed by a differentiable function $f$ that connects the pseudo-task's inputs to its outputs. The goal for solving this pseudo-task is to find a function that minimizes the loss of the underlying task. The completed model is given by:

$$\hat{y}_i = \mathcal{D}_\ell (f(\mathcal{E}_\ell(x_i;\theta_{\mathcal{E}_\ell});\theta_f),x_i;\theta_{\mathcal{D}_\ell}). \tag{4}$$

This pseudo-task decomposition formulation is depicted in FIG. 1, wherein architecture M, for task $\{x_{ti},y_{ti}\}_{i=1}^N$, induces a pseudo-task solved by a function $f.\varepsilon$ is an encoder that provides input to $f$, and D is a decoder that uses the output of $f$ to produce the final prediction. If $f$ is effective for many [task, encoder, decoder] combinations, then it shows generic functionality.

Since all L pseudo-tasks induced by Eq. 2 have the same input-output specification, if $f$ solves one of them, it can be applied to any of them in a modular way. Since all pseudo-tasks are derived from the same universe of tasks and architectures, sharing modules across them can be valuable. Indeed, sharing across related parameter blocks is a common tool to improve generalization in deep learning. For example, a convolutional layer can be viewed as a dense layer with parameter blocks shared across space, and a recurrent layer as a sequential network of dense layers with parameter blocks shared across depths, i.e., time. Similarly, the standard DMTL approach is to design a joint architecture with some parameter blocks shared across related tasks. The present embodiments extend DMTL to sharing factors across related pseudo-tasks, independent of architecture.

Assuming an effective alignment of related pseudo-tasks exists, how should parameters be shared across them? Reusing modules at qualitatively different locations in a network has been successful when a small number of location-specific parameters are included to increase flexibility, and has been detrimental when such parameters are not included. To include such parameters in a simple and flexible way, and avoid additional assumptions about the kind of sharing that can occur, each $\mathbf{B}_\ell$ can be generated by a hypermodule, the module-specific analog of a hypernetwork.

Figure 2:
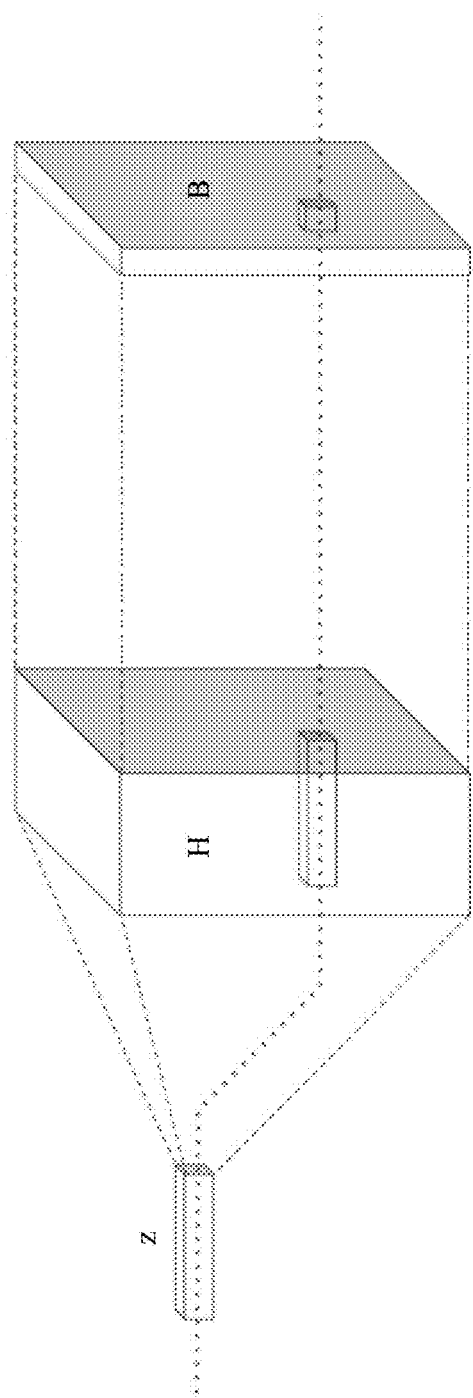
FIG. 2 depicts a visualization of the generation of block parameters via a hypermodule in accordance with one or more embodiments herein.

Associate with the $\ell$ th pseudo-task a context vector $\mathbf{Z}_\ell \in \mathbb{R}^c$. These contexts contain the location-specific parameters that are not shared across locations, analogous to the task-specific factors found in factorization-based MTL methods and task-specific parameters more generally. Suppose there is also a collection of K hypermodules $\{H_k\}_{k=1}^K$, with $H_k \in \mathbb{R}^{c \times m \times n}$ and let $\psi:\{1, \ldots, L\} \to \{H_k\}_{k=1}^K$ be an alignment function that indicates which hypermodule solves the $\ell$ th pseudo-task. Then, the parameters of the underlying architectures are generated by:

$$\mathbf{B}_\ell = \psi(\ell) \bar{x}_1 \mathbf{Z}_\ell, \tag{5}$$

where $\bar{x}_1$ denotes the 1-mode (vector) product of a tensor and a vector. In other words, the value at $\mathbf{B}_{\ell ij}$ is the dot product between $\mathbf{Z}_\ell$ and the fiber in $\psi(\ell)$ associated with the (i,j)th element of $\mathbf{B}_\ell$. A visualization of this generation of block parameters via a hypermodule is shown in FIG. 2. The parameters of a parameter block $\mathbf{B}_\ell$ are generated by applying a hypermodule $H_k$ to the block's context vector $\mathbf{Z}_\ell$. The block's parameters are generated as the 1-mode (vector) product of the hypermodule and the context. That is, instead of learning all of its parameters independently, the block gets its parameters by tuning a generic module to this particular location.

With the additional goal of optimizing $\psi$, the block decomposition (Eq. 2) can now be written as $$\cup_{t=1}^T \theta_{\mathcal{M}_t} = [(H_1, \ldots, H_K), (z_1, \ldots, z_L)]. \tag{6}$$

where $\theta_{\mathcal{M}_t}$ is the original parameter set for the tth task, $H_k$ are hypermodules, and $\mathbf{Z}_\ell$ are contexts, one of which is associated with each pseudo-task. To accurately apply Eq. 6 to a set of architectures, the parameter initialization scheme must be preserved. Say the parameters of a layer are initialized i.i.d. with variance $\sigma^2$ and mean 0, and each $\mathbf{B}_\ell$ is initialized with a distinct hypermodule $\psi(\ell) = H_\ell$. When $c>1$, $\mathbf{B}_{\ell ij} = \langle H_{\ell:ij} \mathbf{Z}_\ell \rangle$ is a sum of random variables, so it is impossible to initialize $\mathbf{H}_\ell$ and $\mathbf{Z}_\ell$ i.i.d. such that $\mathbf{B}_{\ell ij}$ is initialized from a uniform distribution. However, it is possible to initialize $\mathbf{B}_{\ell ij}$ from a normal distribution, by initializing $\mathbf{H}_\ell$ from a normal distribution $\mathcal{N}(0,\sigma_H^2)$ and initializing $\mathbf{Z}_\ell$ with constant magnitude $|z|$:

$$B_{\ell ij} = \langle H_{\ell:ij}, z_\ell \rangle \sim c|z|\mathcal{N}(0, \sigma_H^2) = \tag{7}$$
$$\mathcal{N}(0, z^2 c^2 \sigma_H^2) = \mathcal{N}(0, \sigma^2)|z| = \frac{\sigma}{c\sigma_H}.$$

In this embodiment, $\sigma^2$ and $\sigma_H^2$ are determined by He normal initialization, i.e., they are computed based on the fan-in of the layer in which they are initialized, which implies a unique $|z|$. Although $\mathbf{Z}_\ell$ could be initialized uniformly from $\{-z, z\}^c$, it is instead initialized to the constant z, to encourage compatibility of hypermodules across contexts. Similarly, the fact that all $H_k$ have the same $\sigma_H^2$ makes it easier for them to capture functionality that applies across pseudo-tasks.

Although it is pessimistic to initialize each pseudo-task with its own hypermodule, parsimonious models can be achieved through optimization of $\psi$. Using the same hypermodule for many pseudo-tasks has the side-benefit of reducing the size of the joint model. The original model in Eq. 2 has Lmn trainable parameters, while Eq. 6 has Lc+Kcmn, which is more parsimonious only when K<L(mn−c)/cmn<L/c, i.e., when each hypermodule is used for more than c pseudo-tasks on average. However, after training, any hypermodule used fewer than c times can be replaced with the parameters it generates, so the model complexity at inference is never greater than that of the original model: $(L-L_o)c+Kcmn+L_o mn \leq Lmn$, where $L_o$ is the number of pseudo-tasks parameterized by hypermodules used fewer than c times. An algorithm that improves parsimony in this way, while exploiting related pseudo-tasks, is introduced next.

Given the above decomposition and reparameterization, the goal is to find an optimal alignment $\psi$, given by a fixed-length mapping $(\psi(1), \ldots, \psi(L))$, with K possible choices for each element. Let h be a scoring function that returns the performance of a mapping via training and evaluation of the joint model. In order to avoid training the model from scratch each iteration, existing DMTL approaches that include nondifferentiable optimization interleave this optimization with gradient-based updates. These methods take advantage of the fact that at every iteration there are T scores, one for each task. These scores can be optimized in parallel, and faster convergence is achieved, by effectively decomposing the problem into T subproblems. This section illustrates that such problem decomposition can be greatly expanded, leading to practical optimization of $\psi$.

In general, $\psi$ may be decomposed into D submappings $\{\psi_d\}_{d=1}^D$, each with a distinct evaluation function $h_d$. For simplicity, let each submapping be optimized with an instance of the $(1+\lambda)$-EA, a Markovian algorithm that is robust to noise, dynamic environments, and local optima, and is a component of existing DMTL methods. The algorithm generates new solutions by resampling elements of the best solution with an optimal fixed probability. Algorithm 1 extends the $(1+\lambda)$-EA to optimizing submappings in parallel.

---

Algorithm 1

1. Create initial solutions $\psi_1^0, \ldots, \psi_D^0$ each of length $\frac{L}{D}$
2. while any $\psi_d^0$ is optimal do
3.   for d = 1 to D do
4.     for i = 1 to $\lambda$ do
5.       $\psi_d^i \leftarrow \psi_d^0$
6.       for $\ell$ = 1 to $\frac{L}{D}$ do
7.         With probability $\frac{D}{L}$, $\psi_d^i(\ell) \sim \mathcal{U}(\{H_k\}_{k=1}^K)$
8.     for t =1 to d do
9.       $\psi_d^0 = \text{argmax}_{\psi_d^i} h(\psi_d^i)$

---

Assume each $\psi_d$ has length L/D, $\lambda=1$, all $h_d$ are linear, i.e., $h_d(\psi_d)=\Sigma_{\ell=1}^L W_{d\ell} \cdot I(\psi_d(\ell)=\psi^*_d(\ell))$ where $W_{d\ell}$ are positive scalars, I is the indicator function, and $\psi^*$ is a unique optimal mapping, with $\psi^*(\ell)=H_1 \forall \ell$. The runtime of this algorithm (number of iterations through the whole loop) is summarized by the following result: The expected time of the decomposed K-valued (1+1)-EA is $$O\left(\frac{KL(\log L - \log D)\log D}{D}\right),$$

when all $h_d$ are linear.

Resulting runtimes for key values of D are given in Table 1 below.

TABLE 1

| Decomposition Level | None (Multi-task) | Per-task (Single-task) | Per-block (Pseudo-task) |
|---|---|---|---|
| Expected Convergence Time | O(KLlogL) | $O\left(\frac{KL(\log L - \log T)\log T}{T}\right)$ | O(K1ogL) |

As expected, setting D=T gives a substantial speed-up over D=1. However, when T is small relative to L, e.g., when sharing across a small number of complex models, the factor of L in the numerator is a bottleneck. Setting D=L overcomes this issue, and corresponds to having a distinct evaluation function for each pseudo-task.

The pessimistic initialization suggested above avoids initial detrimental sharing, but introduces another bottleneck: large K. This bottleneck can be overcome by sampling hypermodules in Line 7 proportional to their usage in V. Such proportional sampling encodes a prior which biases search towards modules that already show generality, and yields the following result: The expected time of the decomposed K-valued (1+1)-EA with pessimistic initialization and proportional sampling is O(log L), when D=L, and all $h_d$ are linear.

Figure 3:
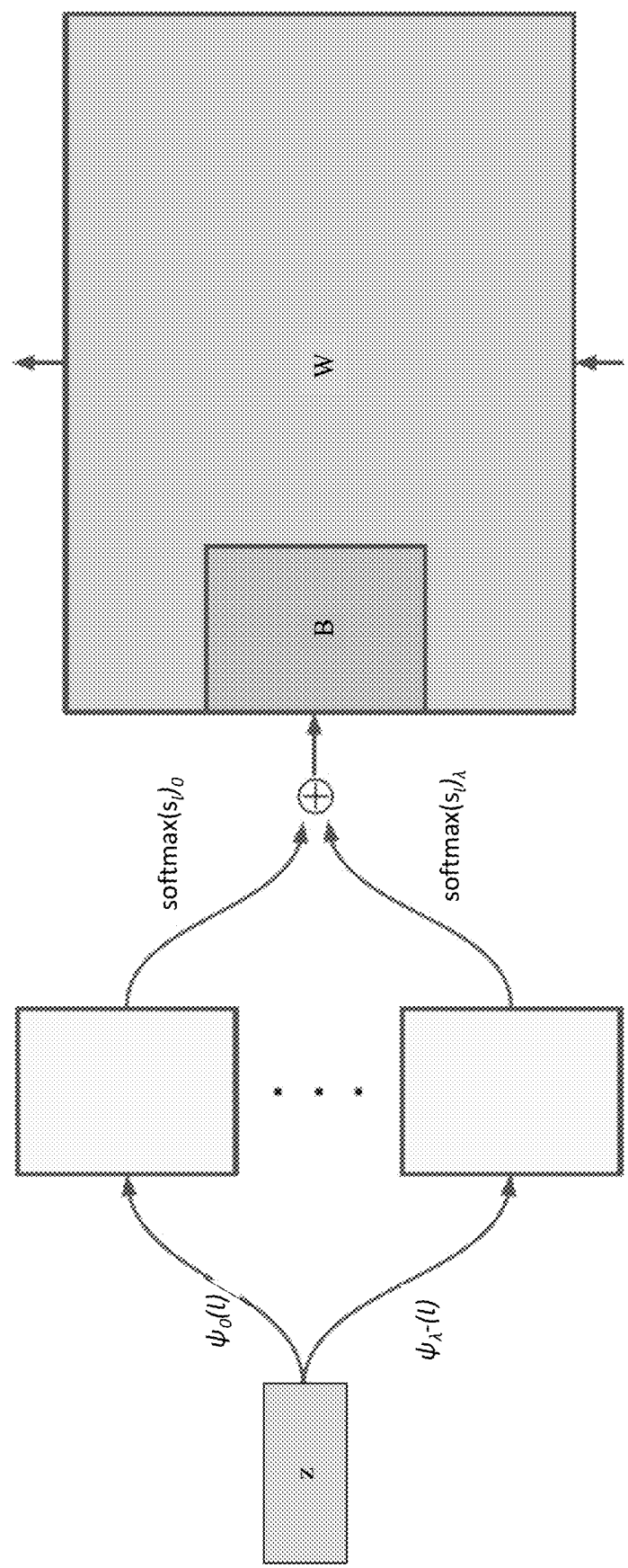
FIG. 3 depicts competition between hypermodules for selection for a particular location in accordance with one or more embodiments herein.

Again, this fast convergence requires a pseudo-task-level evaluation function h. The solution adopted for the embodiments herein is to have the model indicate its hypermodule preference directly through backpropagation, by learning a softmax distribution over modules at each location. Similar distributions over modules have been learned in previous work. In Algorithm 1, at a given time there are 1+$\lambda$ active mapping functions $\{\psi^i\}_{i=0}^\lambda$. Through backpropagation, the modules $\{\psi^i(\ell)\}_{i=0}^\lambda$ for each location can compete by generalizing Eq. 5 to include a soft-merge operation:

$$\mathbf{B}_\ell = \Sigma_{i=0}^\lambda \psi^i(\ell) \bar{x}_i \mathbf{S}_\ell \cdot \text{softmax}(\mathbf{Z}_\ell)_i, \qquad (8)$$

where $\mathbf{S}_\ell \in \mathbb{R}^{\lambda+1}$ is a vector of weights that induces a probability distribution over hypermodules. Through training, the learned probability of softmax $(\mathbf{S}_\ell)_i$ is the model's belief that $\psi^i(\ell)$ is the best option for location $\ell$ out of $\{\psi^i(\ell)\}_{i=0}^\lambda$. A visual depiction of this competition between hypermodules is given in FIG. 3 which depicts the competition between hypermodules for being selected for a particular location, i.e., to parameterize a particular block B within weight matrix W in the original model. Here, z is the context vector associated with B which is mapped to candidate parameter blocks by hypermodules $\psi^i(\ell)$. These candidate blocks are mixed by a soft sum based on the model's belief that each hypermodule is the best for this location out of the current $\lambda$+1 options. Using this belief function, Algorithm 1 can optimize $\psi$ while simultaneously learning the model parameters. Each iteration, the algorithm trains the model via Eq. 8 with backpropagation for $n_{iter}$ steps, and $h(\psi_\ell^i)$ returns $\Sigma_{j=0}^\lambda$ softmax$(\mathbf{S}_\ell)_j \cdot I(\psi_\ell^j=\psi_\ell^i)$, accounting for duplicates. In contrast to existing model-design methods, task performance does not guide search; this avoids overfitting to the validation set over many generations. Validation performance is only used for early stopping.

For the model to learn its hypermodule preferences efficiently, a special learning rate $lr_s$ is assigned to the soft weights $\mathbf{S}_\ell$ in Eq. 8. In the experiments, setting this rate to one or two orders of magnitudes larger than that of the rest of the model yields reliable results. The complete end-to-end algorithm is given in Algorithm 2.

---

Algorithm 2

1. Initialize any non-sharable model parameters $\theta'$.
2. Initialize $\{\mathbf{H}_\ell\}_{\ell=1}^L$, $\{\mathbf{z}_\ell\}_{\ell=1}^L$, and $\psi^0$ with $\psi^0(\ell) = \mathbf{H}_\ell$.
3. Train H, z, $\theta'$ via Eq. 5 for $n_{init}$ backprop steps.
4. for $n_{gen}$ generations do
5.   for $\ell$ = 1,...., L do
6.     $\mathbf{s}_{\ell 0} \leftarrow 0$ -continued Algorithm 2

```
7.      ψⁱ ← ψ⁰
8.      for i = 1,... λ do
9.          S_ℓᵢ ← lnα − lnλ − ln(1 − α)
10.     loc ← [pL]-element random subset of {1, ... , L}
11.     for ℓ ∈ loc do
12.         for i = 1, ... λ do
13.             ψⁱ(ℓ) ← randomHypermodule(ψ⁰)
14.     Train H, z, θ', s via Eq. 8 for n_iter backprop steps.
15.     Evaluate using validation set for each task.
16.     for ℓ = 1,...., L do
17.         ψ⁰(ℓ) ← ψ^{argmax_i Σ_{j=0}^{λ} softmax(s_ℓ)_j · I(ψ_ℓⁱ = ψ_ℓʲ)}(ℓ)
18.     Revert to the state with best validation performance.
19. Train H, z, θ' via Eq. 5 for n_final backprop steps.
```

The algorithm interleaves model training with optimization of ψ. Interleaving makes the algorithm efficient because the model need not be trained from scratch each generation. Instead, λ hypermodule options are sampled for each of [pL] pseudo-tasks, for some $p \in (0, 1]$. Although in theory p=1 yields the fastest convergence, setting p<1 improves the stability of training, reducing the noise that comes from shocking pseudo-tasks with new modules. In the embodiments, p=0.5 was found to yield reliable results. Training can also be made smoother by training for $n_{init}$ steps before optimizing ψ, and by initializing the probability of the current best hypermodule to be 1−α for some small α<1. If $S_{\ell 0}$ is initialized to 0, then, for $i \in \{1, \ldots \lambda\}$, $$\text{softmax}(s_\ell)_i = \frac{\alpha}{\lambda} s_{\ell i} = \ln\alpha - \ln\lambda - \ln(1 - \alpha). \quad (9)$$

However, in the exemplary embodiments herein, $$\alpha = \frac{\lambda}{\lambda + 1},$$

such that there is no initial bias towards previously selected hypermodules. Note that the choice of λ is limited by scalability concerns. The cost of one gradient update is approximately 1+λ times that of the original model. This pressure towards small λ is why λ=1 was used above. This scalability pressure also makes it crucial that the results discussed herein in the examples apply in the case of λ=1. As discussed in the embodiments herein, new hypermodules for a pseudo-task are selected with probability proportional to their current usage. When a hypermodule is no longer used anywhere, it has effectively been deleted. When the number of active hypermodules is less than the initial number K, for theoretical robustness, a small probability ϵ of creating a new hypermodule is always included, similar to the ϵ-greedy approach in reinforcement learning that is known to those skilled in the art. In the exemplary embodiments herein, ϵ is manually set to $10^{-4}$. The distribution for sampling existing hypermodules is then $$P(H_k | \psi^0) = \frac{(1 - \epsilon)}{L} |\{\ell : \psi^0(\ell) = H_k\}|. \quad (10)$$

In practice, there may be some parameters that are not naturally decomposable via Eq. 2. In particular, the initial layer that transforms raw input and the output layer that produces predictions are modality-specific. They are useful as unshared adapters that learn permutations and scaling to translate between specific and generic representations. For example, for each task discussed below, the first and last layers of its architecture are reserved as adapters.

The theoretical scalability of the algorithm means it can be applied in settings where existing DMTL module assembly methods are infeasible. For instance, when learning the alignment with soft ordering, the module operations increase quadratically; sampling from the softmax instead would require thousands of additional parameters per module location; learning the alignment with CTR is infeasibly complex. These limitations are highlighted in the fact that experiments with existing approaches use at most 4, 4, and 10 modules, i.e., orders of magnitude fewer than what is considered in this paper (e.g., more than 10K modules).

Experimental evaluation of the process set forth above is discussed below. First, the dynamics of the process are validated against a synthetic MTL benchmark. Second, the process is applied to a scale-up problem of sharing across diverse architectures and modalities. For the experiment, all models were implemented in PyTorch. Each run was performed using a single NVIDIA GTX 1080 Ti GPU with 12 GB RAM. All models (except AWD-LSTM models) were trained using Adam with default parameters. When the learned parameters $S_\ell$ are reset each generation, their corresponding auxiliary state in Adam is reset as well, to prevent unmeaningful application of this state.

In the following experimental embodiment, an MTL problem is addressed using the process, where the ground truth alignment is known. The synthetic dataset contains 30 linear regression tasks, each with the same 20-dimensional input space and 1-dimensional output. Each task was generated from a random parameter vector, by multiplying random inputs by this vector to generate 15 training samples and 50 test samples. The goal is to minimize RMSE averaged over all tasks. The tasks are grouped into three groups of ten tasks each. The parameter vector for tasks within a group differ only by a scalar factor. Tasks cannot be solved reliably without exploiting this regularity. The linear models in these experiments use a batch size of 10 in training.

Two versions of the problem are considered, one with Gaussian noise added to sample outputs, and one with no noise (clean). As in previous work, each task model is linear, consisting of a single weight vector $\in \mathbb{R}^{20}$. In the single-task (STL) case, these vectors are trained independently. In the MTL case (MUiR), c=1, and each task is reparameterized with a single hypermodule $\in \mathbb{R}^{1 \times 20 \times 1}$. So, Algorithm 1 is initialized with 30 hypermodules, and should converge to using only three, i.e., one for each group. For comparison, a Random search setup is included (i.e., replacing argmax in Algorithm 1 with a random choice), as well as an Oracle setup, in which ψ is fixed to the true group alignment. Unlike in previous work, five training samples for each task were withheld as validation data, making the setup more difficult.

In the experiment, 99 iterations of random search were performed for the noisy case over the hyperparameter ranges $\lambda \in \{1, 2, 4, 8\}$, $p \in \{0.1, 0.25, 0.5, 1\}$, $lr_s \in \{0.01, 0.1, 1, 10\}$, and $n_{iter} \in \{10, 50, 100, 200\}$. The setting with the best validation loss was λ=8, p=0.5, $lr_s$=0.01, and $n_{iter}$=100. This setting was then used across ten runs in both the clean and the noisy case. Since the linear models learn quickly, mint was not needed and set to 0. As indicated, MUiR quickly converges to the true underlying grouping in the noiseless case (FIG. 4), and yields optimal test loss as shown in Table 2.

TABLE 2

| Method | Clean | Noisy |
|---|---|---|
| STL | — | 0.97 |
| MTL-FEAT | — | 0.48 |
| DG-MTL | — | 0.42 |
| GO-MTL | — | 0.35 |
| STL | 1.35 ± 0.01 | 1.49 ± 0.01 |
| MUiR + Random | 1.26 ± 0.04 | 4.67 ± 1.48 |
| MUiR + Oracle | 0.77 ± 0.77 | 0.37 ± 0.00 |
| MUiR + Optimization | 0.00 ± 0.00 | 0.38 ± 0.00 |

Figure 4:
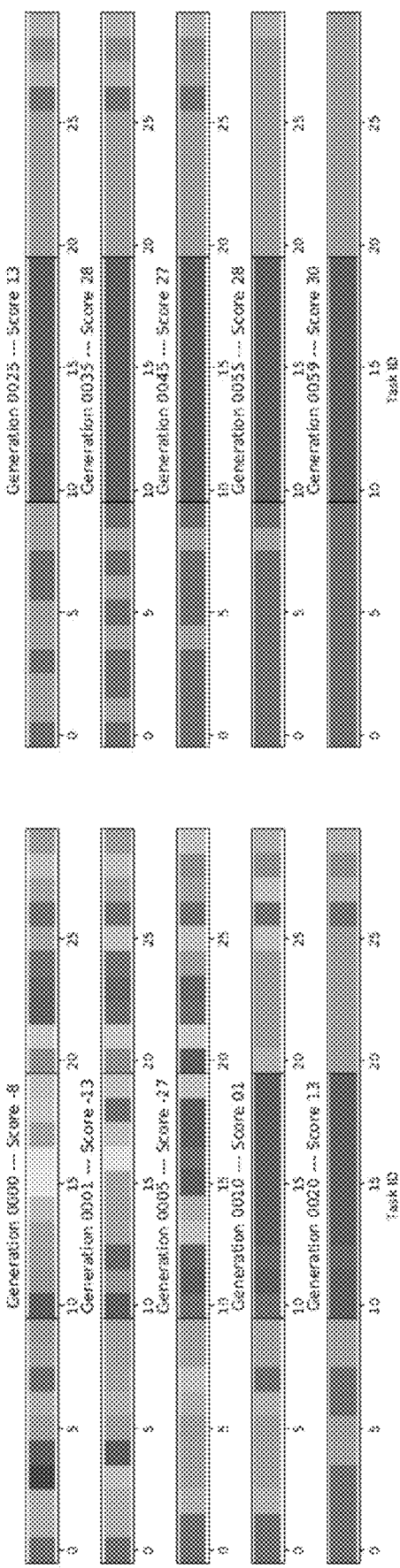
FIG. 4 shows how MUiR quickly converges to the true underlying grouping in the noiseless case in accordance with one or more embodiments herein.

In FIG. 4, the first 10 tasks correspond to the first ground truth group, the second 10 to the second group, and the third to the third group. Each color corresponds to a distinct hypermodule. The color shown at each location is the hypermodule currently in use for that task. At generation 59 and beyond, the model remains at the optimal solution indefinitely. The "Score" at each generation is a coarse measure for how close $\psi$ is to the optimal mapping. Each task adds 1 if the module it uses is shared and only used by tasks in its true group, adds 0 if the module is unshared, and adds −1 If the module is shared by tasks outside of its true group.

For the results in Table 2, each setup was run ten times. Mean and standard error are reported. In Table 2, MUiR achieves perfect test RMSE in the clean case. Surprisingly, in the clean case, the MUiR+Oracle setup performs worse than MUiR+Optimization. This result is due to the fact that the Oracle setup is still able to occasionally overfit to one of the thirty tasks, because there is so little data, and there are no other forms of regularization. In particular, note that the median RMSE for both MUiR+Oracle and MUiR+Optimization was 0.00. In the noisy case, the noise itself provides sufficient regularization for the Oracle to overcome this issue. However, the improvement of Optimization over Oracle in the clean case illustrates a strength of MUiR that is also captured in Table 4. Since each module is trained in many locations over the course of optimization, it is forced to learn generalizable functionality. MUiR similarly outperforms baselines in the noisy case. Since a linear model is optimal for this dataset, MUiR cannot improve over the best linear method, but it achieves comparable results despite differences in the setup that make it more difficult, i.e., withholding data for validation and absence of additional regularization. Also, in contrast to the other methods, MUiR learns the number of groups automatically. These results show that the softmax evaluation function effectively determines the value of hypermodules at each location. The next section shows that the algorithm scales to more complex problems.

Next, MUiR is applied in its intended setting, i.e., sharing across diverse architectures (e.g., Linear, DeepBind, WideResNet, Stacked RNN), core layers (Dense, Conv-1D, Conv-2D, LSTM) and modalities (vision, text, genomic, etc.). The hypermodules generate 16×16 linear maps, and have context size c=4, as in previous work on hypernetworks. The joint model shares across different modalities, e.g., a vision problem, an NLP problem, and a genomics problem.

To scale up to the experiments, the hyperparameter settings above were copied exactly, except for $\lambda$, $lr_s$, $n_{iter}$, and $n_{init}$, which were manually adapted as follows: $\lambda$ was set to 1 for maximum computational efficiency; $lr_s$ was increased to 0.1 so that locations could quickly ignore clearly low-performing modules; $n_{iter}$ was increased to 1000 to handle the larger problem size; $n_{init}$ was set to 2000 so that the model could initially stabilize before alignment optimization.

The first task is CIFAR-10, the classic image classification benchmark of 60K images, 50,000 training images and 10,000 test images. Of the training images, 5,000 are randomly withheld for validation. As in previous work on hypernetworks, WideResNet-40-1 (WRN) is the underlying model, yielding 2268 blocks to parameterize with hypermodules. The first and last layers of the model are reserved as adapter layers. WideResNet defines a family of vision models, each defined by a depth parameter N and a width parameter k. WideResNet-40-1 has N=6 and k=1. This model is the smallest (in terms of parameters) high-performing model in the standard WideResNet family. For the additional set of experiments using LeNet as the vision model, all layer sizes were increased to the nearest multiple of 16. This model is sequential with five layers, of which the middle three are reparameterized. Both CIFAR-10 models use a batch size of 128 for training.

The second task is WikiText-2 language modeling benchmark with over 2M tokens. The goal is to minimize perplexity. The underlying model is the standard stacked LSTM model with two LSTM layers each with 256 units, yielding 4096 blocks. This standard model has one main parameter, LSTM size. In general, increasing the size improves performance. Common LSTM sizes are 200, 650, and 1000. To simplify the setup by making the LSTM weight kernels divisible by the output dimension of hypermodules, the experiments use an LSTM size of 256. The model begins with a word embedding layer, and ends with a dense layer mapping its output to a softmax over the vocabulary. This model uses a batch size of 20 for training.

The third task is CRISPR binding prediction, where the goal is to predict the propensity of a CRISPR protein complex to bind to (and cut) unintended locations in the genome. This is an important personalized medicine problem since it indicates the risk of the technology for a particular genome. When using the technology, there is one particular (target) location that is intended to be cut out by the CRISPR complex, so that this location can be edited. If the complex makes other (off-target) cuts, there may be unintended consequences. Predicting the binding affinity at off-target locations gives an assessment of the risk of the procedure. The dataset contains binding affinities for approximately 30 million base pairs (bp). Input consists of 201 bp windows of one-hot-encoded nucleobases centered around each location. The data is randomly split into non-overlapping training, validation, and test sets, with approximately one million samples withheld for validation and one million for testing. The underlying model, DeepBind-256, is from the DeepBind family of 1D-convolutional models designed for protein binding problems. The first layer embeds the input into 256 channels. The second layer is a 1D convolution with kernel size 24, and 256 output channels, followed by global max pooling. The third layer is fully-connected with 256 hidden units. The final layer is fully-connected with a single output that indicates the predicted binding affinity. The loss is MSE. The middle two layers are re-parameterized by hypermodules, yielding 6400 blocks. This model uses a batch size of 256 for training.

For each of these three task-architecture pairs, a chain of comparisons were run, with increasing generality, including: a Baseline that trained the original architecture; an Intratask setup that applied MUiR optimization within a single task model; cross-modal optimization for each pair of tasks; and a cross-modal run across all three tasks. One run was performed for each of the setups in Table 3, i.e., five to seven runs were performed for each architecture. To confirm the significance of the results, twenty additional runs were performed for the baselines L, S, and, D, as well as for the cross-domain setup L+S+D. The mean (±std. err.) for the baselines was 21.08 (±0.09), 0.1540 (±0.0005), and 134.41 (±0.62), respectively, while for L+S+D they were 20.23 (±0.08), 0.1464 (±0.0002), and 130.77 (±0.12). For all three of these improvements p<1e$^{-4}$ (Welch's t-test).

The main result is that the text and genomics models always improve when they are trained with MUiR, and improve the most when they are trained jointly with the WRN model as presented in Table 3 below.

TABLE 3

| | Modality | | | |
|---|---|---|---|---|
| | Vision | Text | DNA | Vision |
| | Architecture | | | |
| | WRN-40-1 (W) | Stacked LSTM (S) | DeepBind-256 (D) | LeNet (L) |
| Baseline | 8.48 | 134.41 | 0.1540 | 21.08 |
| Intratask | 8.50 | 132.06 | 0.1466 | 20.67 |
| W + S | 8.69 | 130.63 | — | — |
| W + D | 9.20 | — | 0.1461 | — |
| S + D | — | 132.62 | 0.1469 | — |
| W + S + D | 9.02 | 128.10 | 0.1464 | — |
| L + S | — | 129.73 | — | 21.02 |
| L + D | — | — | 0.1469 | 19.59 |
| L + S + D | — | 130.77 | 0.1464 | 20.23 |

The cross-modal results in Table 3 show the performance of each architecture across a chain of comparisons. Baseline trains the underlying model; Intratask uses MUiR with a single task architecture; the remaining setups indicate multiple architectures trained jointly with MUiR. Lower scores are better: classification error for vision, perplexity for text and MSE for DNA. For each architecture, the top two setups are in bold. The LSTM, DeepBind, and LeNet models all benefit from cross-modal sharing; and in all 16 cases, MUiR improves their performance over Baseline. Although the text and DNA models both benefit from sharing with WRN, the effect is not reciprocated. To delve into whether the improvement boost from joint training with the (WRN,vision) pair resulted from the architecture (model) or the task, an additional set of experiments were run using LeNet as the vision model. This model does indeed always improve with MUiR, and improves the most with cross-modal sharing (Table 3), while similarly improving the text and genomics models. The improvements for all three tasks are significant.

Overall, the results confirm that MUiR can improve performance by sharing across diverse modalities. A likely reason that the benefit of WRN is one-directional is that the modules in WRN are highly specialized to work together as a deep stack. They provide useful diversity in the search for general modules, but they are hard to improve using such modules. This result is important because it both illustrates where the power of MUiR is coming from (diversity) and identifies a key challenge for future methods. Overall, the ability of MUiR to improve performance, even in the intratask case, indicates that it can exploit pseudo-task regularities.

Figure 5A:
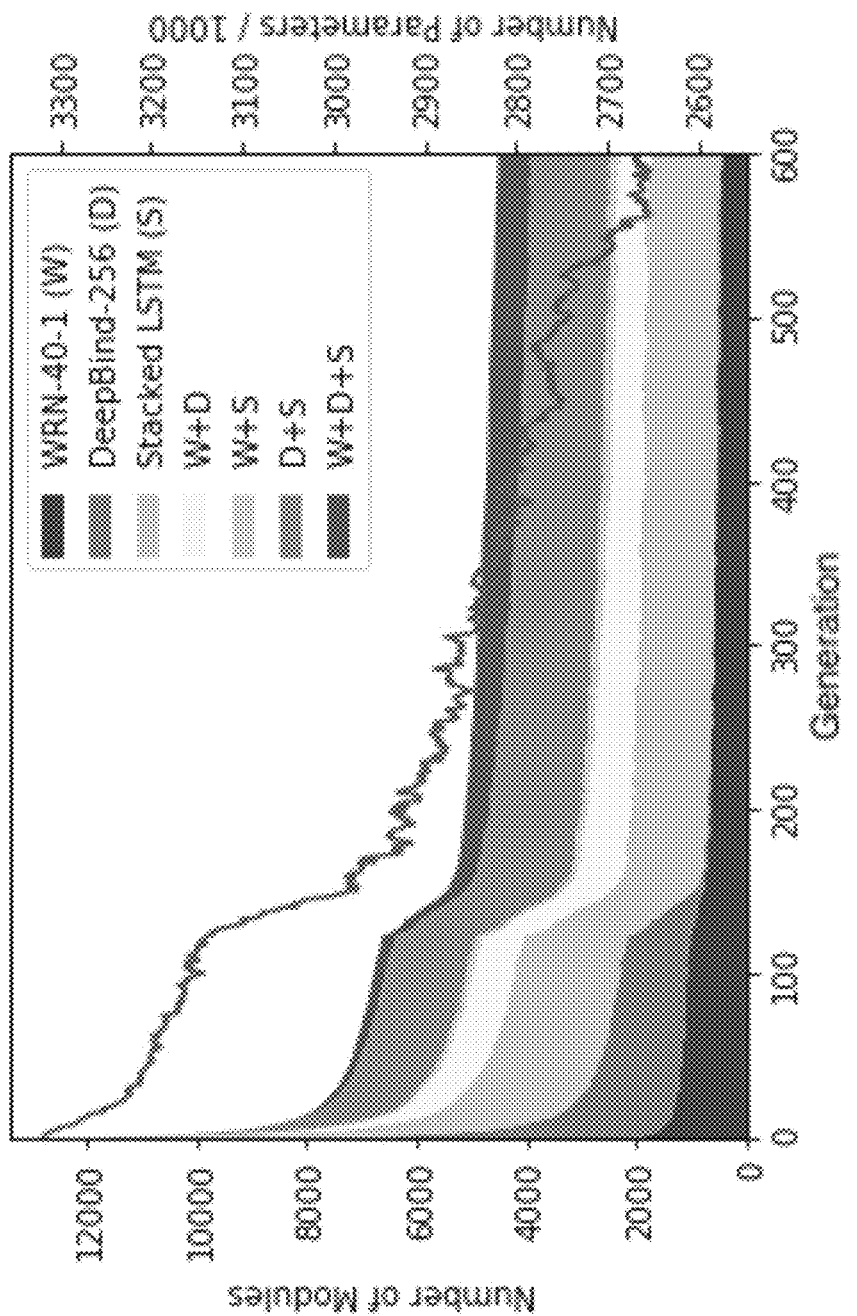
FIG. 5a shows the number of modules used exclusively by each subset of tasks over time in a cross-modal run across three tasks in accordance with one or more embodiments herein.
Figure 5B:
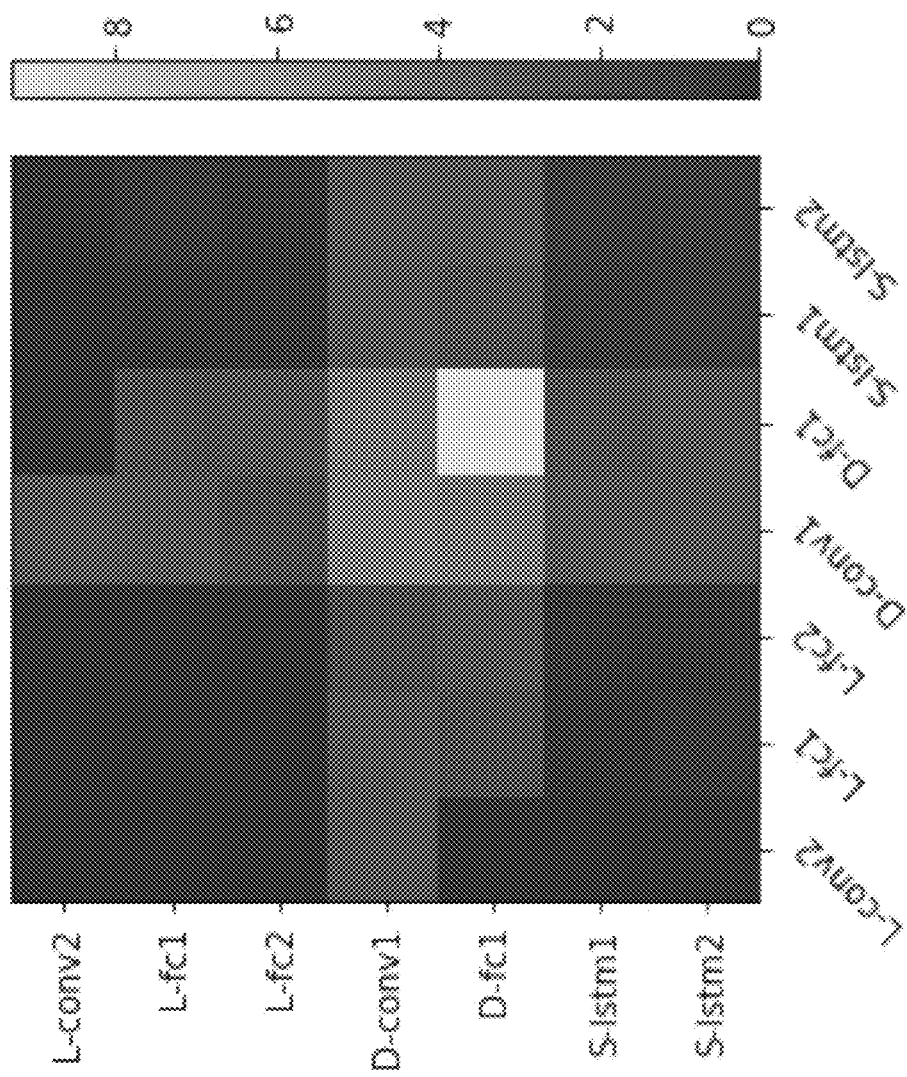
FIG. 5b shows bulk of sharing involves the genomics model in the cross-modal run across three tasks in accordance with one or more embodiments herein.

To understand the discovery process of MUiR, FIG. 5a shows the number of modules used exclusively by each subset of tasks over time in a W+D+S run. The relative size of each subset stabilizes as w is optimized, and is consistent over independent runs, showing that MUiR shares in an architecture-dependent way. In particular, the number of modules used only by W and S models remains small, and the number used only by D shrinks to near zero, suggesting that the genomics model plays a central role in sharing. Analyzed at the layer level in the L+S+D setup, the bulk of sharing does indeed involve D (FIG. 5b). D and L are both convolutional, while D and S process 1-dimensional input, which may make it easier for L and S to share with D than directly with each other.

A side-benefit of MUiR is that the number of model parameters decreases over time (up to 20% in FIG. 5a), which is helpful when models need to be small, e.g., on mobile devices. Such shrinkage is achieved when the optimized model has many modules that are used for many pseudo-tasks. Hypermodules are considered generic if they are used more than c times in the joint model, and specific otherwise. Similarly, pseudo-tasks are considered generic if they use generic modules and specific otherwise, along with their contexts and generated linear maps. Sets of generic and specific tensors were compared based on statistical properties of their learned parameters. The generic tensors had significantly smaller average standard deviation, L2-norm, and max value (Table 4). This tighter distribution of parameters indicates greater generality.

TABLE 4

| Parameter Group | Stdev | Mean | Norm | Max |
|---|---|---|---|---|
| Hypermodules | 7e−4 | 3e−1 | 8e−4 | 6e−3 |
| Contexts | 1e−43 | 1e−143 | 4e−138 | 5e−126 |
| Linear Maps | 3e−153 | 5e−2 | 5e−153 | 4e−146 |

For a W+S+D run of MUiR, Table 4 gives two-tailed p-values (Mann-Whitney) comparing generic vs. specific weight tensors over four statistics for each parameter group: modules, contexts, and the linear maps they generate. The generic tensors tend to have a much tighter distribution of parameters, indicative of better generalization wherein they must be applied in many situations with minimal disruption to overall network behavior. In the results in Table 4 there were 666 generic modules, 4344 specific; and 4363 generic pseudo-tasks (i.e., contexts and linear maps) and 8401 specific. Notably, the differences between generic and specific tensors appear for both hypermodules, which are trained for a variable number of pseudo-tasks, and contexts, which are each trained for only one pseudo-task.

Even though their application seems unnatural for the cross-domain problem, experiments were performed using existing DMTL methods: classical DMTL, i.e., where aligned parameters are shared exactly across tasks; and parallel adapters, which is state-of-the-art for vision MTL. Both of these methods require a hierarchical alignment of parameters across architectures. Here, the most natural hierarchical alignment is used, based on a topological sort of the block locations within each architecture: the ith location uses the ith parameter block. MUiR outperforms the existing methods (Table 5). Interestingly, the existing methods each outperform single task learning (STL) on two out of three tasks. This result shows the value of the universal decomposition discussed above, even when used with other DMTL approaches.

Next, the significance of the ψ initialization method was tested, by initializing MUiR with the hierarchical alignment used by the other methods, instead of the disjointed initialization suggested above. This method (Table 5: MUiR+ Hierarchical Init.) still outperforms the previous methods on all tasks, but may be better or worse than MUiR for a given task. This result confirms the value of MUiR as a framework.

TABLE 5

| Method | LeNet | Stacked LSTM | DeepBind |
|---|---|---|---|
| Single Task Learning | 21.46 | 135.03 | 0.1543 |
| Classical DMTL | 21.09 | 145.88 | 0.1519 |
| Parallel Adapters | 21.05 | 132.02 | 0.1600 |
| MUiR + Hierarchical Init. | 20.72 | 128.94 | 0.1465 |
| MUiR | 20.51 | 130.70 | 0.1464 |

The importance of hypermodule context size c was also tested. Comparisons were run with c=0 (blocks shared exactly), 1, 2, 4 (the default value), and 8. The results confirm that location-specific contexts are critical to effective sharing, and that there is robustness to the value of c (Table 6).

TABLE 6

| c | LeNet | Stacked LSTM | DeepBind |
|---|---|---|---|
| 0 | 21.89 | 144.52 | 0.1508 |
| 1 | 21.80 | 140.94 | 0.1477 |
| 2 | 20.40 | 133.94 | 0.1504 |
| 3 | 20.51 | 130.70 | 0.1464 |
| 4 | 20.62 | 130.80 | 0.1468 |

Finally, MUiR was tested when applied to a highly-tuned Wikitext-2 baseline: AWD-LSTM. Experiments directly used the official AWD-LSTM training parameters, i.e., they are tuned to AWD-LSTM, not MUiR. MUiR parameters were exactly those used in the other cross-domain experiments. MUiR achieves performance comparable to STL, while reducing the optimization (Table 7). In addition, MUiR outperforms STL with the same number of parameters (i.e., with a reduced LSTM hidden size). These results show that MUiR supports efficient parameter sharing, even when dropped off-the-shelf into highly-tuned setups. However, MUiR does not improve the perplexity of the best AWD-LSTM model. The challenge is that the key strengths of AWS-LSTM comes from its sophisticated training scheme, not its architecture. MUiR has unified diverse architectures.

TABLE 7

| Method | LSTM Parameters | Perplexity |
|---|---|---|
| STL | 8.8M | 73.64 |
| MUiR | 8.8M | 71.01 |
| STL | 19.8M | 69.94 |

Given a set of deep learning problems defined by potentially disparate and arbitrary (architecture, task) pairs, MUiR shows that learned functionality can be effectively shared between them. As the first solution to this problem, MUiR takes advantage of existing DMTL approaches, but it is possible to improve it with more sophisticated and insightful methods in the future. Hypermodules are able to capture general functionality, but more involved factorizations could more easily exploit pseudo-task relationships. Similarly, the $(1+\lambda)$-EA is simple and amenable to analysis, but more sophisticated optimization schemes may be critical in scaling to more open-ended settings. In particular, the modularity of MUiR makes extensions to lifelong learning especially promising. It should be possible to collect and refine a compact set of modules that are assembled in new ways to solve future tasks as they appear, seamlessly integrating new architectural methodologies. Such functionality is fundamental to general problem solving, providing a foundation for integrating and extending knowledge across all behaviors during the lifetime of an intelligent agent.

To go beyond methodological sharing in deep learning, the present embodiments describe an approach to learning sharable functionality from a diverse set of problems. Training a set of (architecture, task) pairs is viewed as solving a set of related pseudo-tasks, whose relatedness can be exploited by optimizing a mapping between hypermodules and the pseudo-tasks they solve. By integrating knowledge in a modular fashion across diverse domains, the embodied approach establishes a key ingredient for general problem solving systems in the future. Unlike prior art methodologies with tasks drawn from the same domain and whose fundamental building blocks are modules whose functional specification (e.g., input-output shapes and spatial semantics) are highly dependent on the problems being solved, e.g., graphs of fully-formed convolutional layers or LSTMs, the present embodiments provide a mechanism for sharing modules across such diverse architecture types, and thus across tasks from different domains and different modalities. This mechanism, MUiR, is useful if this level of general sharing is desired or required such as when facing a problem with a completely new modality, e.g., a newly designed geosensor that collects a unique kind of climate data. Even without auxiliary datasets of the same modality, MUiR can be used to provide this type of new problem with a prior model for what successful solutions to real world problems look like, i.e., they are composed of the modules MUiR has collected.

The invention claimed is:

1. A machine-learning process for training and sharing generic functional modules across multiple diverse (architecture, task) pairs for solving multiple diverse problems, comprising:
   decomposing, by one or more specially programmed processors, each of the multiple (architecture, task) pairs into equally sized pseudo-tasks;
   aligning, by the one or more specially programmed processors pseudo-tasks across the multiple diverse architectures, wherein aligning pseudo-tasks comprises optimizing a mapping between the pseudo-tasks and the functional modules of the diverse architectures that solve the pseudo-tasks; and
   sharing, by the one or more specially programmed processors, learned parameters across the aligned pseudo-tasks, wherein each diverse architecture is preserved in performance of its paired task.

2. The process according to claim 1, wherein the diverse architectures include core layers selected from the following group consisting of 2D convolutional, LSTM, 1D convolutional and Dense.

3. The process according to claim 1, wherein the optimizing uses a stochastic algorithm.

4. The process according to claim 1, wherein the sharing by the one or more specially programmed processors learned parameters across the aligned pseudo-tasks is implemented using factorization.

5. The process according to claim 1, wherein the multiple diverse problems are selected from the group consisting of a vision problem, a sorting problem, a natural language processing problem, a speech problem, a biological problem, a geological problem and an astronomical problem.

6. A machine-learning process for training and sharing functional modules across diverse architectures for performing diverse tasks without changing functional forms of underlying predictive models, comprising:

decomposing, by one or more specially programmed processors, each parameter set for each predictive model into parameter blocks, wherein a parameter block is parameterized by a module;

aligning, by the one or more specially programmed processors, pseudo-tasks in accordance with associated parameter sets across the multiple diverse architectures, wherein the aligning includes optimizing a mapping between the pseudo-tasks and the functional modules that solve the pseudo-tasks; and sharing, by the one or more specially programmed processors, modules across the diverse architectures in accordance with a predetermined alignment, wherein the diverse architectures perform diverse tasks and the sharing of modules improves performance in each diverse task.

7. The process according to claim 6, wherein the diverse architectures include core layers selected from the following group consisting of 2D convolutional, LSTM, 1D convolutional and Dense.

8. The process according to claim 6, wherein the optimizing uses a stochastic algorithm.

9. The process according to claim 6, wherein the sharing by the one or more specially programmed processors includes sharing learned parameters across the aligned pseudo-tasks.

10. The process according to claim 9, wherein sharing learned parameters across the aligned pseudo-tasks is implemented using factorization.

11. The process according to claim 6, wherein the multiple diverse tasks are selected from the group consisting of a vision-related task, a sorting-related task, a natural language processing-related task, a speech-related task, a biological-related task, a geological-related task and an astronomical-related task.

12. A computer-implemented machine learning process for training and sharing generic functional modules across multiple diverse (architecture, task) pairs for solving multiple diverse problems, comprising:

means for decomposing, by one or more specially programmed processors, each of the multiple (architecture, task) pairs into equally sized pseudo-tasks;

means for aligning, by the one or more specially programmed processors, pseudo-tasks across the multiple diverse architectures, wherein aligning pseudo-tasks comprises optimizing a mapping between the pseudo-tasks and the functional modules of the diverse architectures that solve the pseudo-tasks; and means for sharing, by the one or more specially programmed processors, learned parameters across the aligned pseudo-tasks, wherein each diverse architecture is preserved in performance of its paired task.

13. The process according to claim 12, wherein the means of optimizing is a stochastic algorithm.

14. The process according to claim 12, wherein the means for sharing by the one or more specially programmed processors learned parameters across the aligned pseudo-tasks includes factorization.

* * * * *